US007672873B2

(12) United States Patent
Kindig et al.

(10) Patent No.: US 7,672,873 B2
(45) Date of Patent: Mar. 2, 2010

(54) MUSIC PURCHASING AND PLAYING SYSTEM AND METHOD

(75) Inventors: Bradley D. Kindig, San Diego, CA (US); Robert F. Kleemann, San Diego, CA (US); Sean Robert Sullivan, San Diego, CA (US); Michael J. Kogan, San Diego, CA (US); Sean Cornell Joshlin, San Marcos, CA (US); Mark Alan Laffoon, San Diego, CA (US); Daniel Davidson Baird, Carlsbad, CA (US); Ameen Hikmat Abed, San Diego, CA (US); Nathan Lavar Clegg, San Diego, CA (US); Philip Mansiel Pellouchoud, San Diego, CA (US); Kevin Sitze, San Diego, CA (US); Amir Doron, San Diego, CA (US)

(73) Assignee: Yahoo! Inc., Sunnyvale, CA (US)

( * ) Notice: Subject to any disclaimer, the term of this patent is extended or adjusted under 35 U.S.C. 154(b) by 887 days.

(21) Appl. No.: 10/938,761

(22) Filed: Sep. 10, 2004

(65) Prior Publication Data

US 2005/0197906 A1 Sep. 8, 2005

Related U.S. Application Data

(60) Provisional application No. 60/502,162, filed on Sep. 10, 2003.

(51) Int. Cl.
*G06Q 30/00* (2006.01)
(52) U.S. Cl. .......................................... 705/26; 705/37
(58) Field of Classification Search ............. 705/26–27, 705/37
See application file for complete search history.

(56) References Cited

U.S. PATENT DOCUMENTS 3,568,156 A   3/1971   Thompson (Continued)

FOREIGN PATENT DOCUMENTS

AU    A53031/98    2/1997

(Continued)

OTHER PUBLICATIONS

U.S. Appl. No. 60/144,377, filed Jul. 16, 1999, Benjamin E. Hosken.

(Continued)

*Primary Examiner*—James Zurita
(74) *Attorney, Agent, or Firm*—James J. DeCarlo; Greenberg Traurig, LLP

(57) ABSTRACT

An online music purchasing system and method is disclosed, in which a radio service operates on a user's computer and is configured for receiving and playing digital radio representations of media content in near real-time in a radio session. A content server is configured for serving the digital radio representations of media content to the radio service, and a radio sequence server is configured for serving a sequential list of currently-playing and previously-played media content of the radio session to the radio service. An account server is configured for receiving a signal indicative of a user's desire to purchase a file of one of a currently-playing or previously-played media content. A download manager is configured for downloading the file to the user's computer according to the signal indicative of the user's desire to purchase the file.

32 Claims, 20 Drawing Sheets

U.S. PATENT DOCUMENTS

| | | | |
|---|---|---|---|
| 4,384,329 A | 5/1983 | Rosenbaum |
| 4,833,610 A | 5/1989 | Zamora |
| 5,062,143 A | 10/1991 | Schmitt |
| 5,182,708 A | 1/1993 | Ejiri |
| 5,241,674 A | 8/1993 | Kuorsawa |
| 5,303,150 A | 4/1994 | Komeda |
| 5,303,302 A | 4/1994 | Burrows |
| 5,371,807 A | 12/1994 | Register |
| 5,392,212 A | 2/1995 | Geist |
| 5,404,505 A | 4/1995 | Levinson |
| 5,418,951 A | 5/1995 | Damashek |
| 5,497,488 A | 3/1996 | Akizawa |
| 5,499,046 A | 3/1996 | Schiller et al. |
| 5,539,635 A | 7/1996 | Larson, Jr. |
| 5,548,507 A | 8/1996 | Martino |
| 5,583,763 A | 12/1996 | Atcheson |
| 5,592,511 A | 1/1997 | Schoen |
| 5,608,622 A | 3/1997 | Church |
| 5,616,876 A | 4/1997 | Cluts |
| 5,661,787 A | 8/1997 | Pocock |
| 5,675,786 A | 10/1997 | McKed |
| 5,678,054 A | 10/1997 | Shibata |
| 5,706,365 A | 1/1998 | Rangarajan |
| 5,708,709 A | 1/1998 | Rose |
| 5,713,016 A | 1/1998 | Hill |
| 5,721,827 A | 2/1998 | Logan |
| 5,726,909 A | 3/1998 | Krikorian |
| 5,740,134 A | 4/1998 | Peterson |
| 5,751,672 A | 5/1998 | Yankowsky |
| 5,754,938 A | 5/1998 | Herz |
| 5,758,257 A | 5/1998 | Herz |
| 5,764,235 A | 6/1998 | Hunt |
| 5,774,357 A | 6/1998 | Hoffberg |
| 5,790,423 A | 8/1998 | Lan et al. |
| 5,790,935 A | 8/1998 | Payton |
| 5,809,246 A | 9/1998 | Goldman |
| 5,819,160 A | 10/1998 | Foladare |
| 5,842,010 A | 11/1998 | Jain |
| 5,862,220 A | 1/1999 | Perlman |
| 5,862,339 A | 1/1999 | Bonnaure |
| 5,864,868 A | 1/1999 | Contois |
| 5,872,921 A | 2/1999 | Zahariev |
| 5,881,234 A | 3/1999 | Schwab |
| 5,883,986 A | 3/1999 | Kopec |
| 5,884,312 A | 3/1999 | Dustan |
| 5,898,833 A | 4/1999 | Kidder |
| 5,913,040 A | 6/1999 | Rakavy |
| 5,913,041 A | 6/1999 | Ramanathan |
| 5,926,207 A | 7/1999 | Vaughan |
| 5,930,526 A | 7/1999 | Iverson |
| 5,930,768 A | 7/1999 | Hooban |
| 5,931,907 A | 8/1999 | Davies |
| 5,941,951 A | 8/1999 | Day |
| 5,945,988 A | 8/1999 | Williams |
| 5,950,189 A | 9/1999 | Cohen |
| 5,956,482 A | 9/1999 | Agraharam |
| 5,960,430 A | 9/1999 | Haimowitz |
| 5,969,283 A | 10/1999 | Looney |
| 5,977,964 A | 11/1999 | Williams |
| 5,983,176 A | 11/1999 | Hoffert |
| 5,987,525 A | 11/1999 | Roberts |
| 5,996,015 A | 11/1999 | Day |
| 6,000,008 A | 12/1999 | Simcoe |
| 6,009,382 A | 12/1999 | Martino |
| 6,012,098 A | 1/2000 | Bayeh |
| 6,020,883 A | 2/2000 | Herz |
| 6,021,203 A | 2/2000 | Douceur |
| 6,026,398 A | 2/2000 | Brown |
| 6,026,439 A | 2/2000 | Chowdhury |
| 6,029,195 A | 2/2000 | Herz |
| 6,031,795 A | 2/2000 | Wehmeyer |
| 6,031,797 A | 2/2000 | Van Ryzin |
| 6,035,268 A | 3/2000 | Carus |
| 6,038,527 A | 3/2000 | Renz |
| 6,038,591 A | 3/2000 | Wolfe |
| 6,047,251 A | 4/2000 | Pon |
| 6,047,268 A | 4/2000 | Bartoli |
| 6,047,320 A | 4/2000 | Tezuka |
| 6,047,327 A | 4/2000 | Tso |
| 6,052,717 A | 4/2000 | Reynolds |
| 6,061,680 A | 5/2000 | Scherf |
| 6,064,980 A | 5/2000 | Jacobi |
| 6,065,051 A | 5/2000 | Steele |
| 6,065,058 A | 5/2000 | Hailpern |
| 6,070,185 A | 5/2000 | Anupam |
| 6,085,242 A | 7/2000 | Chandra |
| 6,097,719 A | 8/2000 | Benash |
| 6,102,406 A | 8/2000 | Miles |
| 6,105,022 A | 8/2000 | Takahashi |
| 6,131,082 A | 10/2000 | Hargrave |
| 6,134,532 A | 10/2000 | Lazarus |
| 6,138,142 A | 10/2000 | Linsk |
| 6,154,773 A | 11/2000 | Roberts |
| 6,161,132 A | 12/2000 | Roberts |
| 6,161,139 A | 12/2000 | Win |
| 6,167,369 A | 12/2000 | Schulze |
| 6,182,142 B1 | 1/2001 | Win |
| 6,185,560 B1 | 2/2001 | Young |
| 6,192,340 B1 | 2/2001 | Abecassis |
| 6,205,126 B1 | 3/2001 | Moon |
| 6,222,980 B1 | 4/2001 | Asai |
| 6,225,546 B1 | 5/2001 | Kraft |
| 6,230,192 B1 | 5/2001 | Roberts |
| 6,230,207 B1 | 5/2001 | Roberts |
| 6,240,459 B1 | 5/2001 | Roberts |
| 6,246,672 B1 | 6/2001 | Lumelsky |
| 6,249,810 B1 | 6/2001 | Kiraly |
| 6,252,988 B1 | 6/2001 | Ho |
| 6,263,313 B1 | 7/2001 | Milsted |
| 6,272,456 B1 | 8/2001 | de Campos |
| 6,272,495 B1 | 8/2001 | Hetherington |
| 6,282,548 B1 | 8/2001 | Burner |
| 6,292,795 B1 | 9/2001 | Peters |
| 6,298,446 B1 | 10/2001 | Schreiber |
| 6,314,421 B1 | 11/2001 | Sharnoff |
| 6,317,761 B1 | 11/2001 | Landsman |
| 6,321,205 B1 | 11/2001 | Eder |
| 6,321,221 B1 | 11/2001 | Bieganski |
| 6,330,593 B1 | 12/2001 | Roberts |
| 6,343,317 B1 | 1/2002 | Glorikian |
| 6,353,849 B1 | 3/2002 | Linsk |
| 6,370,315 B1 | 4/2002 | Mizuno |
| 6,370,513 B1 | 4/2002 | Kolawa |
| 6,385,596 B1 | 5/2002 | Wiser et al. |
| 6,389,467 B1 | 5/2002 | Eyal |
| 6,405,203 B1 | 6/2002 | Collart |
| 6,430,539 B1 | 8/2002 | Lazarus |
| 6,434,535 B1 | 8/2002 | Kupka |
| 6,438,579 B1 | 8/2002 | Hosken |
| 6,487,598 B1 | 11/2002 | Valencia |
| 6,490,553 B2 | 12/2002 | Van Thong |
| 6,505,160 B1 | 1/2003 | Levy et al. |
| 6,512,763 B1 | 1/2003 | DeGolia, Jr. |
| 6,513,061 B1 | 1/2003 | Ebata |
| 6,522,769 B1 | 2/2003 | Rhoads |
| 6,526,411 B1 | 2/2003 | Ward |
| 6,532,477 B1 | 3/2003 | Tang |
| 6,535,854 B2 | 3/2003 | Buchner |
| 6,538,996 B1 | 3/2003 | West |
| 6,557,026 B1 | 4/2003 | Stephens, Jr. |
| 6,560,403 B1 | 5/2003 | Tanaka |
| 6,560,704 B2 | 5/2003 | Dieterman |
| 6,587,127 B1 | 7/2003 | Leeke |
| 6,611,812 B2 | 8/2003 | Hurtado |

| | | |
|---|---|---|
| 6,611,813 B1 | 8/2003 | Bratton |
| 6,614,914 B1 | 9/2003 | Rhoads |
| 6,615,208 B1 | 9/2003 | Behrens |
| 6,655,963 B1 | 12/2003 | Horvitz |
| 6,657,117 B2 | 12/2003 | Weare |
| 6,658,151 B2 | 12/2003 | Lee |
| 6,661,787 B1 | 12/2003 | O'Connell |
| 6,677,894 B2 | 1/2004 | Sheynblat |
| 6,725,446 B1 | 4/2004 | Hahn |
| 6,741,980 B1 | 5/2004 | Langseth |
| 6,757,740 B1 | 6/2004 | Parekh |
| 6,807,632 B1 | 10/2004 | Carpentier |
| 6,889,383 B1 | 5/2005 | Jarman |
| 6,925,441 B1 | 8/2005 | Jones, III |
| 6,952,523 B2 | 10/2005 | Tanaka |
| 7,349,663 B1 * | 3/2008 | Joseph ............... 455/3.02 |
| 2001/0005823 A1 | 6/2001 | Fischer |
| 2001/0042107 A1 | 11/2001 | Palm |
| 2001/0042109 A1 | 11/2001 | Bolas |
| 2001/0044855 A1 | 11/2001 | Vermeire |
| 2001/0052028 A1 | 12/2001 | Roberts |
| 2001/0055276 A1 | 12/2001 | Rogers |
| 2002/0002039 A1 | 1/2002 | Qureshey |
| 2002/0002541 A1 | 1/2002 | Williams |
| 2002/0004839 A1 | 1/2002 | Wine |
| 2002/0007418 A1 | 1/2002 | Hegde |
| 2002/0010621 A1 | 1/2002 | Bell |
| 2002/0010714 A1 | 1/2002 | Hetherington |
| 2002/0010789 A1 | 1/2002 | Lord |
| 2002/0013852 A1 | 1/2002 | Janik |
| 2002/0016839 A1 | 2/2002 | Smith |
| 2002/0035561 A1 | 3/2002 | Archer |
| 2002/0056004 A1 | 5/2002 | Smith |
| 2002/0065857 A1 | 5/2002 | Michalewicz |
| 2002/0082901 A1 | 6/2002 | Dunning |
| 2002/0095387 A1 | 7/2002 | Sosa |
| 2002/0099696 A1 | 7/2002 | Prince |
| 2002/0099737 A1 | 7/2002 | Porter |
| 2002/0107802 A1 | 8/2002 | Philips |
| 2002/0111912 A1 | 8/2002 | Hunter |
| 2002/0129123 A1 | 9/2002 | Johnson |
| 2002/0152204 A1 | 10/2002 | Ortega |
| 2002/0175941 A1 | 11/2002 | Hand |
| 2003/0002608 A1 | 1/2003 | Glenn |
| 2003/0007507 A1 | 1/2003 | Rajwan |
| 2003/0028796 A1 | 2/2003 | Roberts |
| 2003/0046283 A1 | 3/2003 | Roberts |
| 2003/0083871 A1 | 5/2003 | Foote |
| 2003/0093476 A1 | 5/2003 | Syed |
| 2003/0133453 A1 | 7/2003 | Makishima |
| 2003/0135513 A1 | 7/2003 | Quinn |
| 2003/0139989 A1 | 7/2003 | Churquina |
| 2003/0165200 A1 | 9/2003 | Pugel |
| 2003/0182139 A1 | 9/2003 | Harris |
| 2003/0190077 A1 | 10/2003 | Ross |
| 2003/0206558 A1 | 11/2003 | Parkkinen |
| 2005/0149759 A1 | 7/2005 | Vishwanath |
| 2005/0287972 A1 * | 12/2005 | Christensen et al. ...... 455/186.1 |

FOREIGN PATENT DOCUMENTS

| | | |
|---|---|---|
| EP | 01/73639 | 5/1986 |
| EP | 0 847 156 A2 | 9/1997 |
| EP | 1010098 B1 | 4/1998 |
| EP | 1324567 A2 | 4/1998 |
| EP | 0955592 A2 | 4/1999 |
| EP | 1 050 833 A2 | 8/2000 |
| EP | 1236354 | 9/2002 |
| GB | 2306869 | 11/1995 |
| JP | 2001202368 | 7/2001 |
| JP | 2001521642 | 11/2001 |
| KR | P2002-0072434 | 9/2002 |
| KR | P2002-0090397 | 12/2002 |
| WO | WO 97/07467 | 2/1997 |
| WO | WO 98/25269 | 6/1998 |
| WO | WO 98/47080 | 10/1998 |
| WO | WO 99/27681 | 6/1999 |
| WO | WO 99/43111 | 8/1999 |
| WO | WO 00/46681 A1 | 2/2000 |
| WO | WO 00/31964 | 6/2000 |
| WO | WO 01/33379 A1 | 10/2000 |
| WO | WO 01/35667 A1 | 11/2000 |
| WO | WO 01/54323 A2 | 1/2001 |
| WO | WO 01/73639 A1 | 10/2001 |
| WO | WO 02/42862 A2 | 5/2002 |
| WO | WO 02/45316 A | 6/2002 |
| WO | WO 02/65341 A2 | 8/2002 |
| WO | WO 02/65341 A3 | 8/2002 |
| WO | WO 03/012695 A2 | 2/2003 |

OTHER PUBLICATIONS

U.S. Appl. No. 60/165,726, filed Nov. 15, 1999, Sean Michnel Ward.
U.S. Appl. No. 60/165,727, filed Nov. 15, 1999, Sean Michnel Ward.
U.S. Appl. No. 60/166,039, filed Nov. 17, 1999, Sean Michnel Ward.
Adam B. Stubblefield, et al., "A Security Analysis of My.PP3.com and the Beam-it Protocol".
Alan Griffiths, H. Claire Luckhurst and Peter Willett, "Using Interdocument Similarity Information in Document Retrieval Systems," pp. 365-373, John Wiley & Sons, Inc., 1986.
Ben J. Schafer, et al., "Recommender Systems In E-Commerce", Proceedings ACM Conference On Electronic Commerce, pp. 158-166, XP002199598, 1999.
Brian P. McCune, Richard M. Tong, Jeffrey S. Dean, and Daniel G. Shapiro, "RUBRIC: A System for Rule-Based Information Retrieval," pp. 440-445.
C. J. van Rijsbergen, B.Sc., Ph.D., M.B.C.S, "Information Retrieval," Department of Computing Science—University of Glasgow [online], 1979 [retrieved on Aug. 24, 2001] Retrieved from <URL:http://www.dcs.gla.ac.uk/keith/preface.html> (213 pages).
Carl de Marcken, "The Unsupervised Acquisition of a Lexicon from Continuous Speech," Massachusetts Institute of Technology Artificial Intelligence Laboratory: Center for Biological and Computational Learning, Department of Brain and Cognitive Sciences, A.I. Memo No. 1558 and C.B.C.L. Memo No. 129, Nov. 2001, pp. 1-27.
Charu C. Aggarwal, Cecilia Procopiuc, Joel L. Wolf, Philip S.Yu, and Jong Soo Park, "Fast Algorithm for Projected Clustering;", Proceedings of the ACM SIGMOD International Conference on Management of Data, 1999.
Connor Hayes, et al., Smart Radio—A Proposal, Technical Report TCD-CS-1999-24, Online! Apr. 1999, pp. 1-14, XP002279579, Trinity College Dublin, Ireland, Retrieved from the Internet: <URL:http://www.cs.tcd.ie/publications/tech- reports/reports.99/TCD-CS-1999-24.pdf>, retrieved on May 7, 2004.
Cyril Cleverdon, "The Cranfield Tests On Index Language Devices," presented Apr. 27th 1967, pp. 47-59, Found in: Readings in Information Retrieval, Edited by Karen Sparck Jones and Peter Willett, Morgan Kaufmann Publishers, Inc., San Francisco, CA, 1997.
Cyril W. Cleverdon and J, Mills, "The Testing Of Index Language Devices," presented Feb. 5, 1963, Chapter 3—Key Concepts, pp. 98-1 10, Found in: Readings in Information Retrieval, Edited by Karen Sparck Jones and Peter Willett, Morgan Kaufmann Publishers, Inc., San Francisco, CA, 1997.
David A. Hull and Gregory Grefenstette, "Querying Across Languages: A Dictionary-Based Approach to Multilingual Information Retrieval," pp. 484-492.
David Nichols, et al., Recommendation And Usage In The Digital Library, Technical Report Ref. CSEG/2/1997, Online! 1997, pp. 1-15, XP002279577, Retrieved from the Internet <URL:ftp://ftp.comp.lancs.ac.uk/pub/reports/1997/CSEG.2.97.pdf>, retrieved on May 7, 2007.
E. Michael Keen, "Presenting Results of Experimental Retrieval Comparisons," Department of Information & Library Studies, University College of Wales, Aberystwyth, Sy23 3AS U.K., pp. 217-222.

Erling Wold, Thom Blum, Douglas Keislar, and James Wheaton, "Content-Based Classification, Search, and Retrieval of Audio," IEEE MultiMedia, Fall 1996.

F.W. Lancaster, "MEDLARS: Report on the Evaluation of Its Operating Efficiency," pp. 223-246.

Gerard Salton and C. Buckley, "Term-Weighting Approaches In Automatic Text Retrieval," (received Nov. 19, 1987; accepted in final form Jan. 26, 1988), Department of Computer Science, Cornell University, Ithaca, NY.

Gerard Salton and M. E. Lesk, "Computer Evaluation Of Indexing and Text Processing," pp. 60-84, Found in: Readings in Information Retrieval, Edited by Karen Sparck Jones and Peter Willett, Morgan Kaufmann Publishers, Inc ., San Francisco, CA, 1997.

Gerard Salton and M.J. McGill, "The SMART and SIRE Experimental Retrieval Systems," pp. 381-399.

Gerard Salton and Michael J. McGill, "Introduction to Modern Information Retrieval," Computer Science Series, pp. 1-435, 1983 by McGraw-Hill, Inc., McGraw-Hill Book Company, USA.

Gerard Salton, A. Wong and C.S. Yang, "A Vector Space Model for Automatic Indexing," Cornell University, pp. 273-280.

Gerard Salton, James Allan, Chris Buckley and Amit Singhal, "Automatic Analysis, Theme Generation, and Summarization of Machine-Readable Texts," pp. 478-483.

Ian Goldberg, Steven D. Gribble, David Wagner, Eric A. Brewer "The Ninja Jukebox" Oct. 14, 1999.

Ian H. Witten and Eibe Frank, "Data Mining, Practical Machine Learning Tools and Techniques with JAVA Implementations", Academic Press, pp. 57-76.

Internet Papers: Freetantrum: Songprint 1.2, and computer code; www.freetantrum.org.

Jean Tague-Sutcliffe, "The Pragmatics of Information Retrieval Experimentation Revisited," School of Library and Information Science, University of Western Ontario, Canada, pp. 205-216.

Karen Sparck Jones and Peter Willett (Editors),Chapter 3—"Key Concepts," pp. 85-92 Found in: Readings in Information Retrieval, Morgan Kaufmann Publishers, Inc ., San Francisco, CA, 1997.

Karen Sparck Jones, G.J.F. Jones, J.T. Foote, and S.J. Young, "Experiments in Spoken Document Retrieval," pp. 493-502.

Karen Sparck Jones, "Search Term Relevance Weighting Given Little Relevance Information," pp. 329-338, (originally located in Journal of Documentation, vol. 35, No. 1; Mar. 1979, pp. 30-48).

Lauren B. Doyle, "Indexing and Abstracting by Association—Part 1," pp. 25-38, Santa Monica, CA, Found in: Readings in Information Retrieval, Edited by Karen Sparck Jones and Peter Willett, Morgan Kaufmann Publishers, Inc., San Francisco, CA, 1997.

Lisa F. Rau, "Conceptual Information Extraction and Retrieval from Natural Language Input," Artificial Intelligence Program GE Research and Development Center, Schenectady, NY 12301, pp. 527-533.

M. Agosti, G. Gradenigo, P.G. Marchetti, "A Hypertext Environment for Interacting with Large Textual Databases," pp. 469-477.

M. F. Porter, "An Algorithm For Suffix Stripping," Computer Laboratory, Corn Exchange Street, Cambridge, 313-316.

M.E. Maron and J.L. Kuhns, "On Relevance, Probabilistic Indexing and Information Retrieval," pp. 39-46, Found in: Readings in Information Retrieval, Edited by Karen Sparck Jones and Peter Willett, Morgan Kaufmann Publishers, Inc ., San Francisco, CA, 1997.

MusicMatch Literature downloaded from web.archive.org—7 pages total.

N.J. Belkin, R.N. Oddy, H.M. Brooks, "The Journal of Documentation", pp. 299-304, vol. 38, No. 2, Jun. 1982.

RealNetworks Literature downloaded from web.archive.org—16 pages total.

R. Brody, Ph.D., "The Conditions and Consequences of Profiling in Commercial and Governmental Settings," Technology And Society, 1998. ISTAS 98. Wiring The World: The Impact of Information Technology On Society, Proceedings of the 1998 International Symposium on South Bend, IN, USA Jun. 12-13, 1998, NY, NY, USA, IEEE, US, Jun. 12, 1998, pp. 148-154, XP010291443, ISBN: 0-7803-4327-1.

S.E Robertson, "The Probability Ranking Principle In 1R," School of Library, Archive, Information Studies, University College of London, pp. 281-286.

S.E. Robertson and S. Walker, "Some Simple Effective Approximations to the 2—Poisson Model for Probabilistic Weighted Retrieval," Centre for Interactive Systems Research, Department of Information Science, City University, Northampton Square, London, ECIV OHB, U.K., pp. 345-354.

Shoshana Loeb, "Architecting Personalized Delivery Of Multimedia Information", Communications Of The ACM vol. 25, No. 12, Dec. 1992, pp. 39-50, XP002102709.

Tej Shah, "Improving Electronic Commerce Through Gathering Customer Data", TCC402 [online] Apr. 23, 1998 XP002379874, University of Virginia, USA, Retrieved from the Internet: <URL:http://www.lib.virginia.edu> [Retrieved on May 8, 2006].

Thomas Hoffman, et al., "Latent Class Models For Collaborative Filtering", Proceedings Of The Sixteenth International Joint Conference On Artificial Intelligence, IJCAI 99, Stockholm, Sweden, Jul. 31-Aug. 6,1999, Online! pp. 688-693, XPOO2279578, Retrieved from the Internet <URL:http:/Avww.cs.brown.edu/(th/papers/HofmannPuzicha-IJCA199.pdf>, retrieved on May 7, 2004.

Tomek Strzalkowski, "Robust Text Processing in Automated Information Retrieval," Courant Institute of Mathematical Sciences, pp. 317-322.

Unjung Nam, Lectures: "Mel-Frequency Cepstral Analysis," [online] [retrieved on Feb. 2, 2001] Retrieved from the Internet <URL:http://www.ccrma.standford.edu/~unjung/mylec/mfcc.html>, pp. 1-3.

W. B. Croft and D. J. Harper, "Using Probabilistic Models of Document Retrieval Without Relevance Information," Department of Computer & Information Science, University of Massachusetts, pp. 339-344.

W. J. Hutchins, "The Concept of 'Aboutness' in Subject Indexing," presented Apr. 18, 1977, Chapter 3—Key Concepts, pp. 93-97, Found in: Readings in Information Retrieval, Edited by Karen Sparck Jones and Peter Willett, Morgan Kaufmann Publishers, Inc ., San Francisco, CA, 1997.

Z. Liu, et al., "Audio Feature Extraction and Analysis for Scene Segmentation and Classification".

Supplementary Search Report (EP App. No. 04783925.3).

* cited by examiner

FIG. 15

MUSIC PURCHASING AND PLAYING SYSTEM AND METHOD

CROSS REFERENCE TO RELATED APPLICATIONS

This application claims priority to U.S. Provisional Application Ser. No. 60/502,162, filed on Sep. 10, 2003.

BACKGROUND

Enjoyment of online music, in which digital representations of music are stored and transferred electronically in a network as files, is increasingly popular. Various peer to peer file sharing programs have hastened the popularity of online music, as have the proliferation of computing devices that can store and "play" such digital representations of music. Web sites or other programs have now begun to emerge by which consumers can browse, listen, and purchase music, usually in the form of an online "store" that mail ordered CDs to the customer.

Conventional online music purchasing systems do not offer a radio service, in which digital media files such as music are transmitted an received for playing in near real time. Likewise, typical online radio services do not allow a user to select and purchase a song that has previously played or is currently playing. The user usually cannot employ the radio functionality at the same time he or she is purchasing a track.

Some conventional digital rights management (DRM) schemes do not support the concept of set-wise rights, i.e. rights pertaining to playlists of multiple tracks. Additionally, some of these implementations of DRM do not allow tracks that are licensed to be utilized on multiple machines (e.g. a work machine, a home machine, and a laptop). There might also be a lack of provisions to protect and treat a playlist of multiple tracks as an entity. However, current DRM schemes require that the content be encrypted, and that keys used for decrypting the content be stored securely. This can make accessing DRM compliant content computationally and time intensive, and can further result in sluggish behavior from applications that access DRM content.

SUMMARY

This document discloses an electronic "jukebox" system that enables real-time, online commerce of music utilizing digital downloads and online fulfillment. This system provides for instant songtrack (i.e. "track") purchases, with the tracks being delivered automatically as DRM-protected music files delivered via download and then automatically managed within a jukebox (JB) client application. When a purchase is approved, a track is queued for download by a track download manager (TDM) that is part of the JB. The TDM handles all aspects of the download, including error recovery and obtaining DRM licenses for the purchased track.

The system also provides for utilizing a user's offline behavior to suggest tracks for purchase by the user in the online system. The system analyzes play behavior and determines relationships between songs. These relationships are then used to suggest tracks for purchase by the user. The "loop" is closed when the system "sees" plays of purchased tracks within the JB after the completion of the download. This analysis and recommendation capability enhances the user experience, and assists the user in discovering new music that is consistent with their observed behavior and preferences.

The system further allows a user to purchase tracks while the user simultaneously plays an Internet radio service. The system uses personalized radio as the discovery tool for new music, and then allows the user, with a pre-existing account, to instantly purchase online those songs that they are hearing or have recently heard on the radio service.

The system also provides delivery of purchased tracks concurrent with the playing of radio. The user does not have to stop listening to the radio to purchase tracks or have their purchases be fulfilled. This capability is based on the TDM not "interfering" with the operation of the JB and thereby allowing both radio and download to operate concurrently.

Another aspect provided by the system includes linking suggested songs to currently playing track. The system allows users to listen to and purchase tracks that are shown (through the personalization system) to be related to a currently-played song. If the user clicks on an information button associated with the current song in a user interface display, related songs are displayed (i.e. linked to) based on the discovered relationships.

Another aspect of the system includes changing a display of suggestions coincident with changes of the currently-playing song track. Accordingly, when a played track changes from one track to another, the suggestions associated therewith provided to the user also change.

Yet another aspect includes displaying a history of tracks played through the radio and providing a mechanism to allow the user to purchase songs that have recently played. As stated above, interfaces with the radio are central to a satisfying user experience. Allowing the user to see the history of songs recently played and select songs for purchase from this list is a key part of that experience.

The system also provides for allowing users to select and purchase individual tracks from a multi-track album. The system also generates and displays ads based on currently playing song and related tracks. To do an effective job of serving ads that are relevant and actionable, the system can synchronize the ads to the playing tracks and related tracks. The selections will be based on the relationships that are contained in a personalization database.

Still yet another aspect of the systems and methods disclosed herein include extensions to existing digital rights management (DRM) technology to extend single-machine DRM rights to multiple machines belonging to a single user, and managing playlists of protected tracks. Users are provided with a certain, minimum amount of freedom to utilize the tracks that they purchase online. Additional extensions provide rapid access to the DRM content.

The details of one or more embodiments are set forth in the accompanying drawings and the description below. Other features, objects, and advantages will be apparent from the description and drawings, and from the claims.

BRIEF DESCRIPTION OF THE DRAWINGS

These and other aspects will now be described in detail with reference to the following drawings.

FIG. 15 shows yet another user interface in accordance with an embodiment of a jukebox system.

Like reference symbols in the various drawings indicate like elements.

DETAILED DESCRIPTION

This document discloses a juke box (JB) system suitable for a client/server computing environment which users operating a client computer can purchase, receive and/or play digital multimedia files transmitted from a server computer. One such suitable environment is a number of client computers connected to one or more server computers via the Internet. However, the methods and systems described herein are also applicable for any type of communication system including, but not limited to, a wireless communication system, an intranet, a wide area network (WAN), a local area network (LAN) and the like.

A client computer is any type of personal computing device, including, without limitation, desktop or laptop PC, handheld computer such as a personal digital assistant (PDA), a cell phone, MP3 player, or other computing device.

Figure 1:
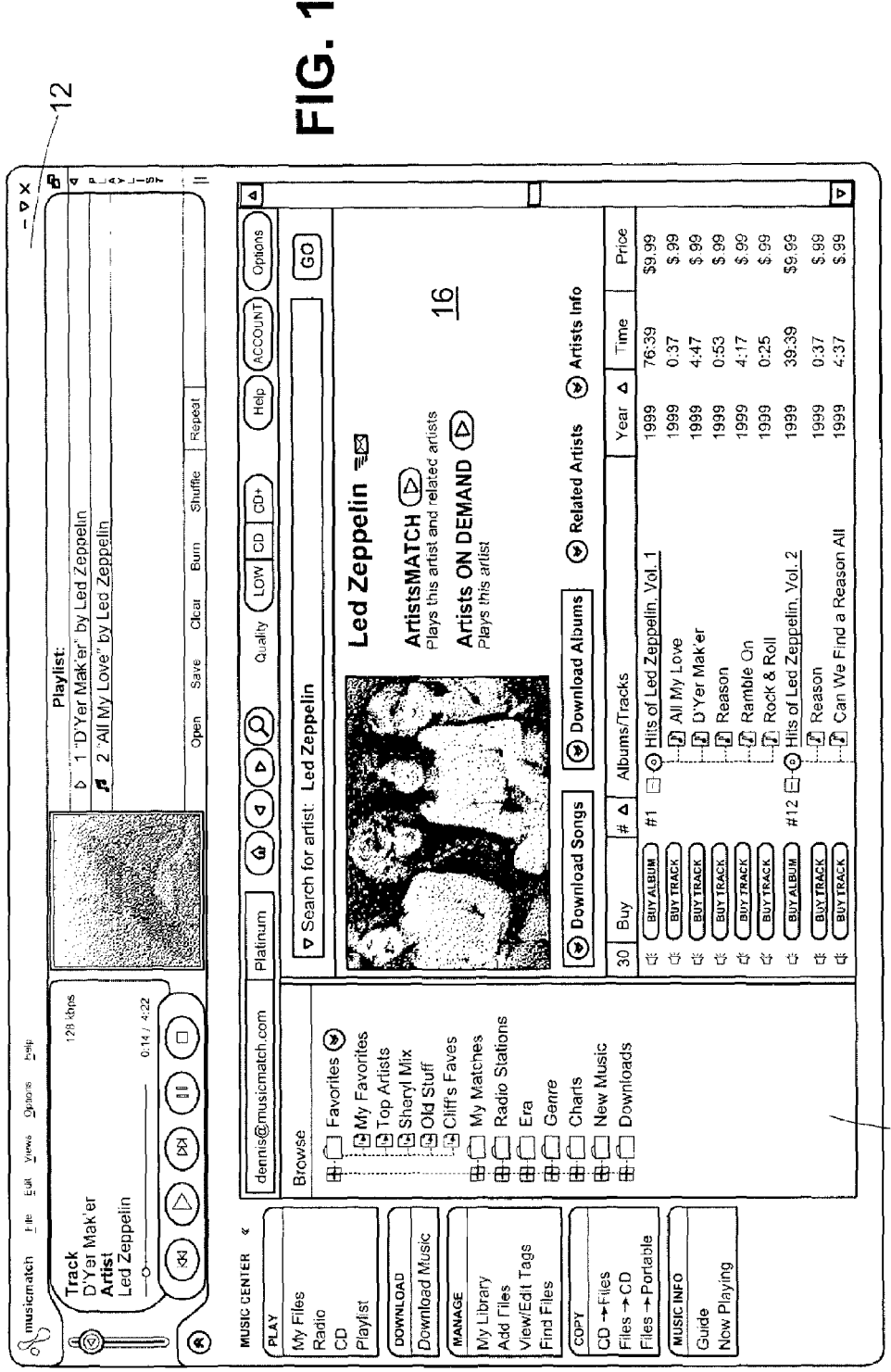
FIG. 1 illustrates an exemplary user interface for a jukebox system.

FIG. 1 shows a user interface (UI) 10 for a JB system according to an exemplary embodiment. The JB system integrates music download and purchase options into the user's normal listening environment via the UI 10. The JB system also provides a download store, where the customer can purchase downloads. Accordingly, the JB system integrates radio services 12, guide pages 14 and download pages 16 into a unified UI 10.

Two paths by which a user can first decide to download a track include: 1) the user discovers an artist while listening to one of the artist's tracks they have purchased, as represented by an MP3 file or the like, and notice they can easily buy more music from that artist; and 2) the user hears a track they like playing on a network radio service and are allowed to purchase it. In both cases, the first track purchase will be an impulse purchase. After that first impulse purchase, the JB system can encourage the user to continue shopping by providing a list of existing favorites and/or new music the user may want to buy. Personalization and popularity information are used, both in programming the original radio entertainment experience, as well as in enabling the user to navigate across the music databases to find other music they want to buy.

In accordance with an exemplary embodiment, the JB system provides downloadable content at a quality and format of 160 kbps WMA9. Some independent content may also be provided at 160 kbps MP3. Tracks come pre-tagged with high resolution cover art. The JB system track catalogue preferably includes 250,000 tracks or more. In a specific embodiment, a user can burn one particular play list a predetermined number of times, i.e. 10 times. By making any changes to the play list, such as substituting one track with another, the user can burn the changed play list the same or another number of times. According to one embodiment, content can be played simultaneously on any number of authorized personal computers (PCs) simultaneously.

In one embodiment, track content is playable on any player platform or device that supports secure WMA 9. The JB system encourages users to make backups of their downloaded files by copying them to alternate PCs or burning them as data files onto CDs. Users may restore these files onto a new PC and use their account to obtain new licenses (subject to the simultaneous PC limit, if applicable).

In one embodiment, there are four integrated entry points into the download offering from music center controls: 1) Download music; 2) Radio; 3) Guide; and 4) Now Playing. Download Music displays a "store front" interface optimized for users to search, browse, and receive recommendations for music available for purchase. Radio displays an interface optimized for users to find and launch radio stations, or to create their own custom radio stations. Guide displays general information about music and artists. Now Playing displays information about the currently playing track, including links to purchase related music.

Default views differ for pages of these different paths. For instance, the layout of the artist lists pages differs for pages shown in each of these modes. View settings for all pages are "sticky" from page to page. The Guide and Now Playing view settings are sticky even after the JB session ends. Radio and downloads are sticky only within a JB session.

The JB system allows users to search the music databases by artist name, album name or track name. Other criteria can be used. In an embodiment, the user can manually select the mode in which they wish to search. For example, classical enthusiasts can type in a name of a composer in an artist view. Artist search results show fuzzy text matches. Album search results show text matches based on words in common with the query, and the various artists that published an album under the specified name. Track name search results show matches based on words in common with the query, and the artists and albums containing that track name.

Downloads may be accessed from the Radio Play list control, via "Buy Track" buttons, and information buttons that take the user to the album page if possible, and the artist page if no album resolution is possible. In one embodiment, the "Buy Track" button only appears right justified for the highlighted track. The Buy, Go To Artist Page, and Go to Album Page are also accessible via "right clicks" of a two or more button mouse. (The buy right click opens the album page, or the artist page if album not found).

Downloads may also be accessed from the File Play List control, via the information buttons that take the user to the album page if possible, and the artist page if no album resolution is possible. Information buttons are provided next to all tracks, and a play arrow next to the playing track. The Go To Artist Page, and Go to Album Page are also accessible via right clicks. In one embodiment, the jukebox has no knowledge of which tracks are for sale, except in radio mode. Users can create a wish list and add tracks to their wish list. To purchase a track from their wish list, the user can click on a buy track or buy album selector, depending on a chosen mode.

The UI 10 includes a number of web pages for display in a client program such as a browser. These pages are described in further detail below.

Home Pages. There are various types of home pages. In an exemplary embodiment, the system can include a Download Home Page, a Radio Home Page and a Guide Home Page, accessible from a music center "download music" button, a "radio" button, and a "guide" button respectively. When the system does not have personalized user information, it defaults to a standard view of each home page. When the system does have personalized user information, it defaults to a personalized view of each home page.

Artist Pages. There are several views for every artist page. In an embodiment, these views include: 1) Download Tracks; 2) Download Albums; 3) Related Artists; and 4) Artist Info. If the user is in radio mode, only artists that have associated radio stations are listed, and the related artists shows the number of tracks in the station, and shows a custom playlist creation button. In radio mode, artist pages have one or more "Play" buttons that start the playback of the one or more stations based on that artist. In the Guide or Download mode, the artist list may contain only artists with content that can be purchased, as well as the number of downloads available.

Station Pages. In one embodiment, there are three types of station pages: 1) Radio Pages; 2) Genre Pages; and 3) Era Pages. These station pages can include the same function controls such as buttons, tabs, etc., follow the same rules and behave in the same way. Each of these page types has two main views: 1) Download Tracks; and 2) Show Artists. Station pages have a "Play" button to start the playback of the station described on the page.

Charts. In one embodiment, there are three charts pages: 1) Top Tracks; and 2) Top Albums and Top Artists. Each of these pages feature the top track, top album or top artist, respectively, according to ranking based on popularity. These pages can be updated periodically.

New Music. In one embodiment, there are three new music pages: 1) New Tracks; 2) New Albums; and 3) New Artists. They feature the most popular new track, new album or new artist respectively. Pages are ranked according to popularity, and can be updated periodically, i.e. weekly.

Album Pages. In one embodiment, there are three album page views: 1) Download Tracks; 2) Related Artists; and 3) Album Info. Users can access the album pages from most download track listings in the various artist and station pages, as well as the Download Albums view on the Artist pages.

Custom Station Pages. Users can create multi-artist Artist-MATCH or multi-artist Artist on Demand (AOD) stations from any page with an artist list, which the user enters via the radio. An ArtistMATCH station is a station that plays the referenced artist as similar artists. An Artist-On Demand station is a station that plays the referenced artist exclusively or nearly exclusively. These include artist pages, with the related artists view, station pages, with the show artists view, and charts, new music or My Matches in an artist list view. All these pages can have a custom play list creation button. Once users click on the custom playlist creation button, they can see a page. Once a user has saved a custom station, it is added into My Favorites. In one embodiment, all custom stations have two views: 1) Download Tracks (the default); and 2) Show Artists.

The UI 10 includes a control bar showing various information related to the user and his use of the system. For example, the control bar can include: 1) Log in Status, either user name/account type if the user is logged in, or "log in" if not, as well as an option to log out; 2) Navigation; 3) Requested Quality; 4) Help, including a tutorial sub-item; 5) Account; 6) Options, including an option to switch between shopping cart mode and instant checkout mode, as well as an option to "show again" for purchase confirmation; and 7) Search Bar (which by default will be open and set to search for artist. In one embodiment, banner ads can appear above the control bar.

The UI 10 further includes a folder structure. The folder structure includes a number of folders according to which a user can catalog and organize information. In one embodiment, there are eight main folders: 1) Favorites; 2) My Matches; 3) Radio Stations; 4) Genre; 5) Era; 6) Charts; 7) New Music; and 8) Downloads. Several of these folders are described in further detail below.

Favorites: Users can add any station to the Favorites folder by "right clicking" over any page, or by using a favorites manager accessible through the "favorites manager" button in front of the favorites folder. If the user clicks on "recommend new favorites," the system can add a number of new recommended favorites to the Favorites folder based on the users listening profile. If the user accepts, the recommended stations are added into the user's Favorites folder. If the user has no listening profile, this can start the personalization process.

Users can opt into the personalization process in several ways: 1) selecting the "recommend new favorites" control; 2) selecting a "personalize" control, preferably located in an unpersonalized home page; and/or 3) selecting the My Matches folder. In one process, the user's music recommendations can be "jumpstarted," i.e. instantly generated. In another process, the system user can allow the system to track the music the user listens to. The system uses the following data sources to personalize: 1. My favorites, 2. jukebox play behavior, 3. self-described favorite artists from the jump start process, and 4. purchased downloads.

My Matches. The My Matches folder can include a number of stations. In an embodiment, the folder includes the stations of My Track Matches, My Album Matches and My Artist Matches. Station lists within this folder can be ranked in expected preference order, and can be updated periodically.

Downloads. Selecting the download folder opens up a track download manager (TDM) page that shows the complete record of all the music a user has purchased, and the status of each track. The TDM provides status positions such as: 1) "downloading—%"; 2) "queued"; and 3) "complete". Local files may be playable from this page. From the setting in the main jukebox menu, the user can modify the destination directory for downloaded tracks.

The JB system allows users to purchase content. In an example scenario, the JB system provides users who select any downloadable track with a short "clip" or partial segment of the track. The quality of the clip can correspond to Low/Mid/High settings in a main radio menu. In one embodiment, low corresponds to 24 kbps, and mid and high correspond to 64 kbps. A Preview function for these clips behaves similarly as a preview mode in the library. The track appears in the main player window, preferably with cover art, but does not appear in the playlist window. If the user is in radio mode, starting the clip stops or overrides the radio station. A user can select a download by selecting "buy track" or "buy album" from any download page, or selecting "buy track" in the radio playlist.

If the user is not logged in to their account, the system asks them to log in, or get an account if they do not have one. Users can be asked to enter in a personal question and answer in case they forget their password and need to retrieve it later. If the user does not have an account, the system prompts the user to set one up. First, the user enters their email address and password. Once the user has chosen his or her password, he or she is asked to assent to an end user license agreement (EULA).

Once the user has accepted the EULA, he or she enters in billing information in a Billing Information Page. The credit card is authorized to ensure that it is valid. If a track purchase is in progress, a standard authorization amount will be authorized (for example, $9.90). If a track purchase is not in progress, an authorization for a nominal amount ($1.00) is performed. In one embodiment, the authorization must succeed, or the user is not permitted to progress past the Billing Information page.

Once the user has set up his or her account, the system informs them that account setup has been successful, and confirms whether they want to complete the original transaction. Subsequent transactions also require a confirmation. The system can include an automatic upgrade feature, wherein users of older versions of the system see a modified confirmation page that informs them that upgrade to a later version will be automatic upon confirmation. If agreed to by the user, the upgrade commences.

Users may be given an option to use a shopping cart mode, for example from their options button on the main control bar. If the user selects shopping cart mode, selecting buy track or buy album gets shopping cart confirmation, and then adds selected tracks into their "cart" or electronic storage. The cart can be accessed via a cart folder in the browse bar. The cart folder shows the number of tracks currently in the shopping cart. Users can click on this folder to open their shopping cart, sample the tracks they've added, ensure the total is correct, and then check out. In one embodiment, the shopping cart is only visible if it includes tracks.

At the time of the first transaction of a session, the system verifies validity of the credit card, and that at least a nominal amount, i.e. $10, is available in the account. However, the credit card is not actually billed for a period of time, i.e. 24 hours, after completion of the first transaction, or until after the user has rung up the nominal value's worth in downloads, whichever comes first. Users receive an email confirmation after each credit card billing.

In one embodiment, downloads start within one second after placing order. Progress may be viewed in the TDM. Users can click on the Downloads folder to open up the TDM and check the status of their downloads. Cover art and status indicator bar are optionally provided. Users can pause and resume downloads by right clicking on any download in progress in the TDM. Should the user's network connection fail during a download, the TDM automatically reconnects and finishes the download, without user intervention, as soon as reconnection is made.

An animated icon that shows that there is a download in progress is displayed next to the download folder. By default, downloads automatically appear in the play list and the library upon completion, with the files appearing in the library as indicated by the relevant identifier tags. Users may change these settings via the standard options/setting menu.

Once they have purchased and downloaded their music, users can play, manage, and mix purchased tracks into playlists, as with regular MP3s. In one embodiment, there is no visible differentiation between secure tracks purchased using the system, and any other track on the user's PC, except that the user may choose to expose the file format column in their library.

According to an exemplary embodiment, users can selectively view only purchased content from the library view menu as one of the standard library views. Content can be sent to any WMA 9 compatible appliance as many times as the user wishes. Content can be "burned," i.e. stored on a replayable persistent medium such as compact disk, using exactly the same interface and process as all other files, only constrained by a preselected number of identical playlists that may be burned.

Figure 2:
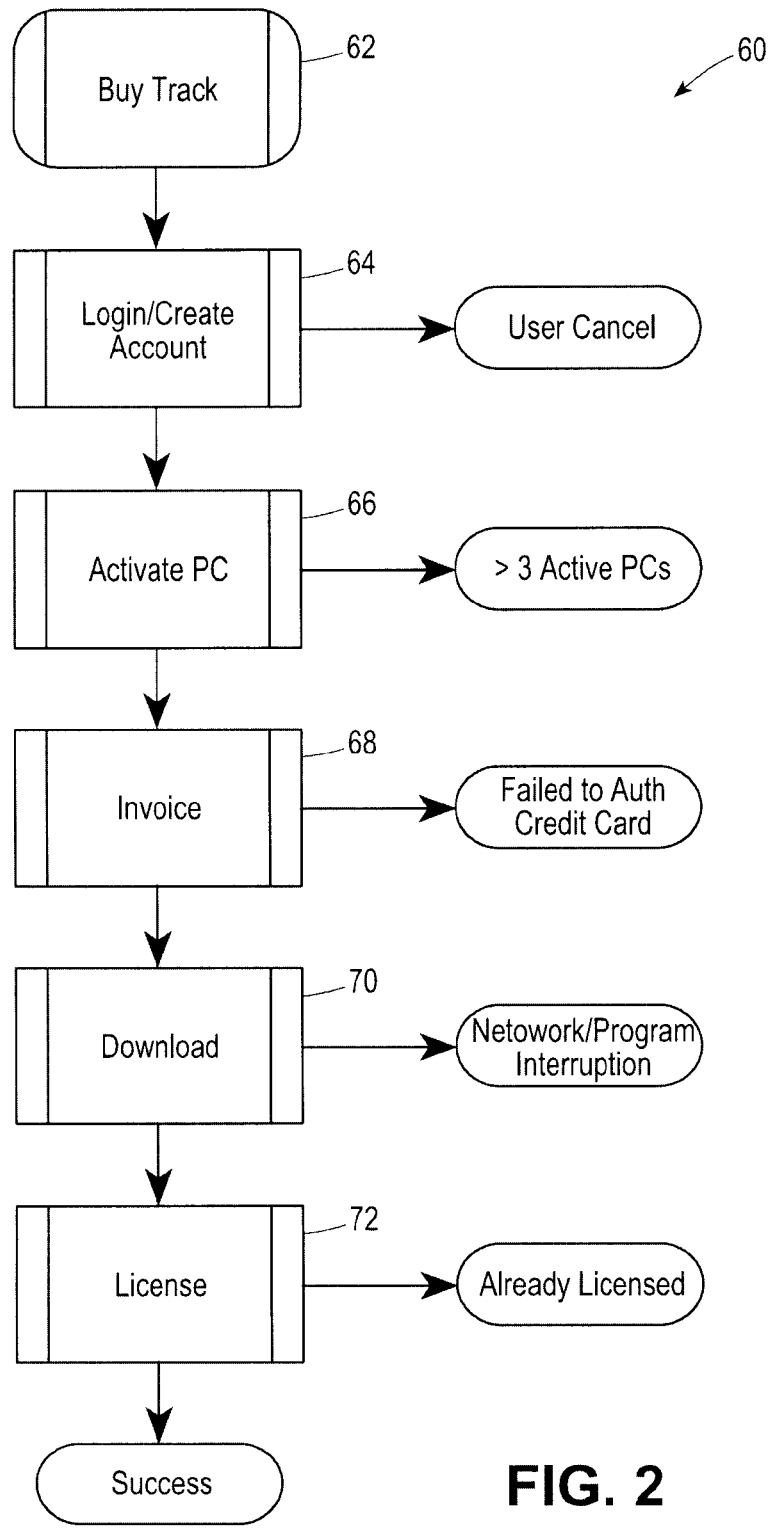
FIG. 2 is a general system architecture functional flow diagram.

FIG. 2 is a flowchart of a general operation 60 according to one embodiment of a JB system. The user clicks on a "buy track" button at block 62. At block 64, the user logs in or sets up an account if not already logged in. At block 66, if the user's computer has not been activated for this account, it is registered and counted against the user's limit. The user's credit card is authorized, an invoice is created at block 68, and the track being purchased is added to the invoice. The track is then downloaded to the user's computer at block 70, and the license for the track is obtained at block 72.

Figure 3:
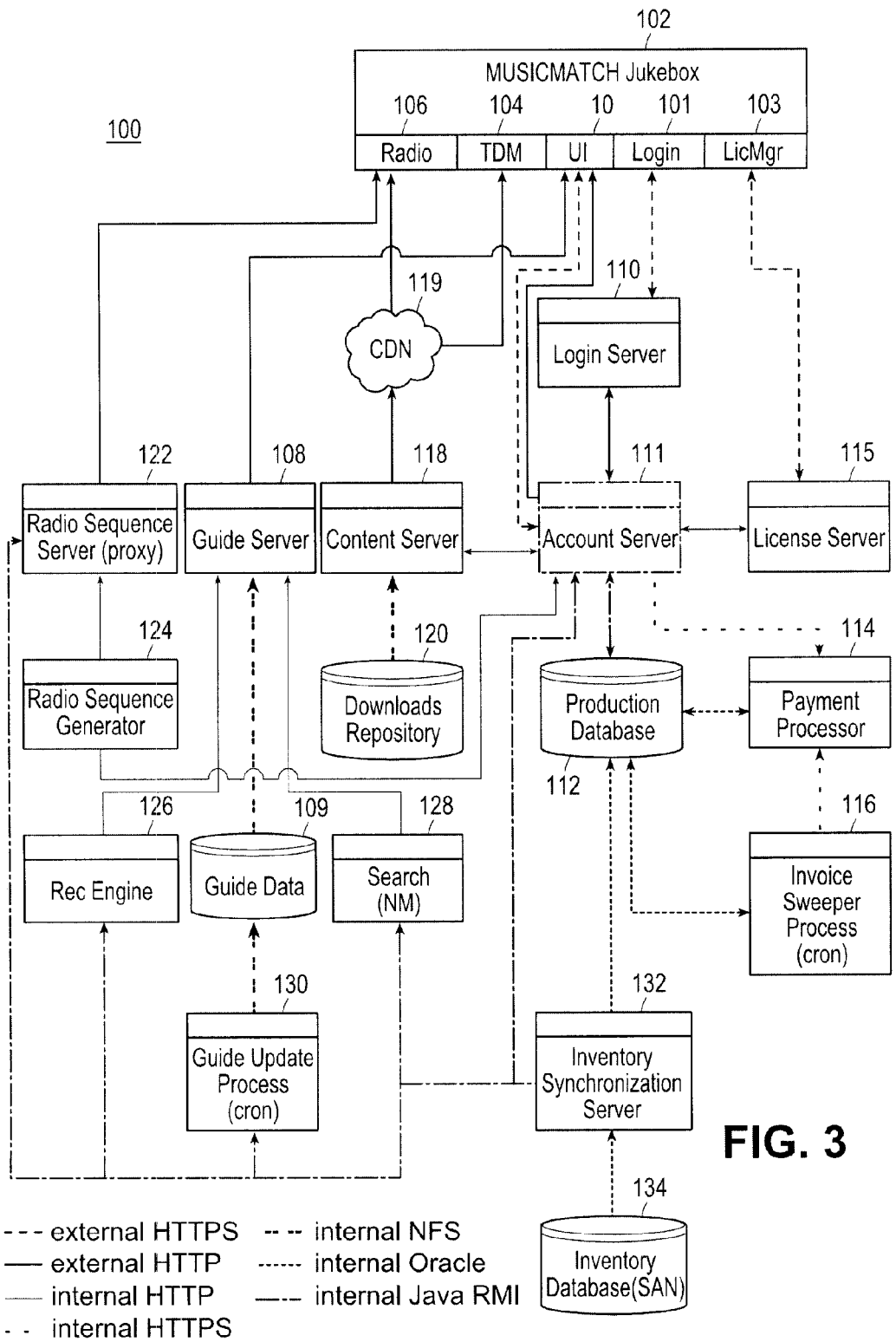
FIG. 3 is a block diagram of a jukebox system architecture.

FIG. 3 is a block diagram of a JB system 100 architecture. The JB system includes a digital jukebox 102, the core functionality of which, i.e. the downloading and licensing of purchased tracks, DRM, etc., is handled by a Track Download Manager (TDM). The digital jukebox 102 also includes the UI 10, as described above. In one embodiment, the UI is a DHTML/XML/JavaScript based web interface that runs in a browser. The UI 10 and data is served from a guide server 108 that serves up guide data 109 such as biographical information about music artists, album information such as creation date, etc. The guide data 109 is periodically revised by a guide update process 130. The digital jukebox 102 also includes a radio service 106, a secure login capability 101, and a licensing manager 103.

A login server 110 handles user login functions in cooperation with an account server 111, which can handles specific logins such as premium services, etc. Track purchases are handled by the account server 111 and recorded in an account database in a production database 112. A payment processing server 114 handles credit card transactions, and is responsive to an invoice sweeper process 116. A license server 115 issues licenses for purchased DRM content. The license server 115 communicates with the account server 111 to verify that licenses are issued for purchased content, and reports data to the licensing manager 103.

The account server 111 manages invoices and authorizations of payment instrument such as credit cards. In an embodiment, the account server receives a signal that a particular user wishes to purchase, and then examines the profile of the user to determine the risk to the merchant of executing the purchase. On the basis of the risk profile, the account server executes logic to select a course of action among various options. The risk profile may be determined based on a number of factors, including for example, previous purchase behavior of the user, billing information associated with the account, and information passed along with the signal to purchase.

The options generated by the account server 111 include, without limitation: requiring a payment instrument pre-authorization of at least the amount of the purchase be associated with the group of purchases before the purchase may be added to the group; allowing the purchase to be added to a group of purchases without a payment instrument pre-authorization and setting a maximum amount and age for the group of purchases, that once exceeded, will trigger the charging of the items as a group to the payment instrument; and requiring that the user enter additional information before performing a payment instrument authorization of at least the amount of the purchase. The additional information may include information associated with the credit card, and/or the IP address of the computer from which the purchase signal was received.

A content server 118 downloads content, i.e. streams or other content transmission technique, to the radio service 106 and TDM 104 via a content data network 119. The content is provided from a downloads repository 120. The radio service 106 receives radio content from a radio sequence server 122 or its proxy. The radio content is streamed according to a sequence generated by a radio sequence generator 124. A recommendation engine 126 provides personalized recommendation data to the guide server 108. Many of the operations and processes are regulated by an inventory synchronization server 132 that operates on an inventory database 134. This server determines, among other things, which tracks and albums are for sale and their current price.

Figure 4:
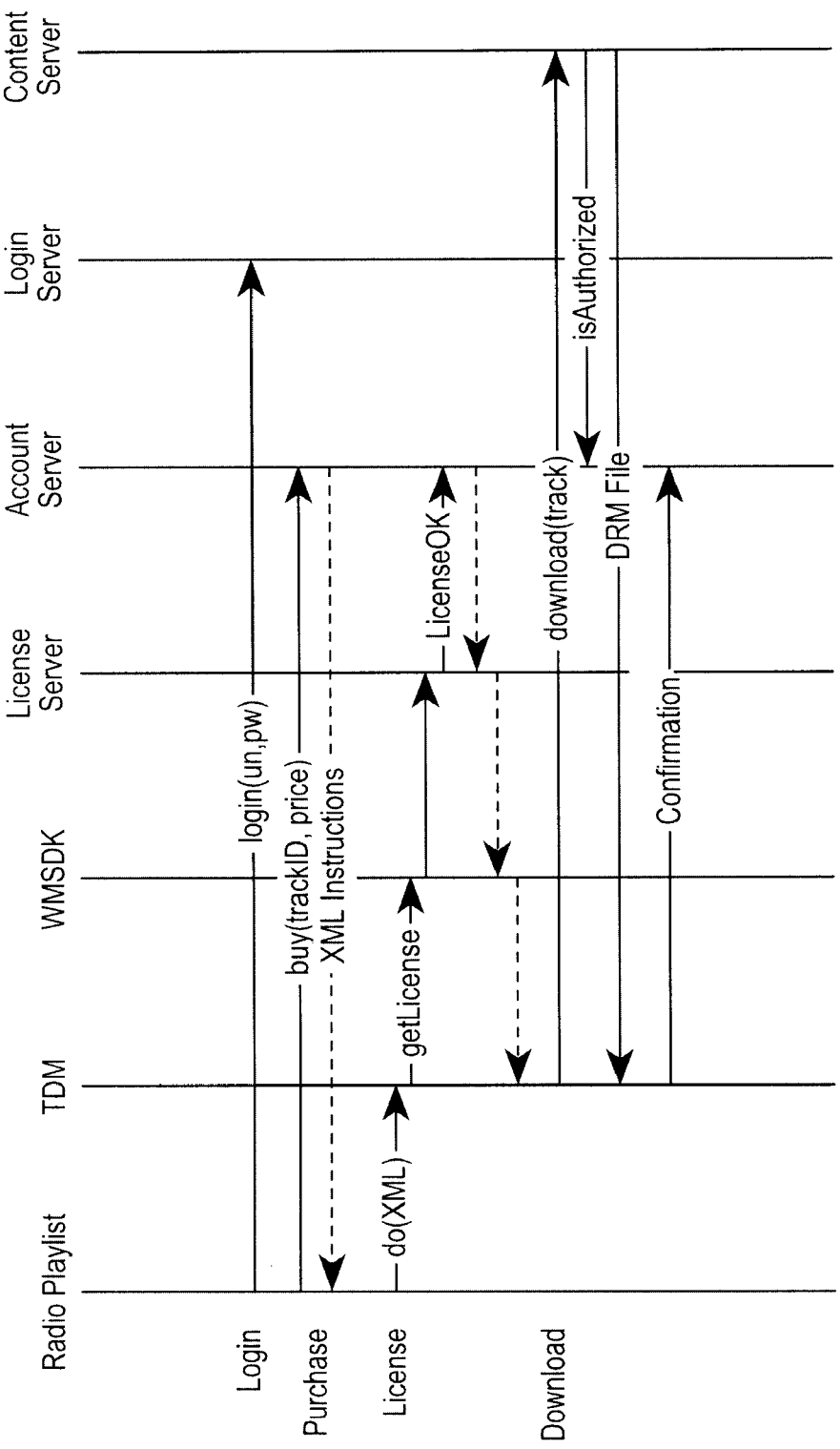
FIG. 4 is a ladder diagram illustrating communication for a track purchase.

FIG. 4 is a ladder diagram illustrating communications among several components of the architecture 100 shown in FIG. 3 to execute a track purchase according to one embodiment. The user logs in using the UI. The login server validates the username and password and issues credentials. The login server obtains the credentials from the account server and passes them back to the UI in the form of a 'cookie' attached to the login response. The user presses the "buy track" button in the UI and the UI sends the "buy" message to the account server passing the login credentials, the track ID and the price displayed in the interface. This allows the system to issue a warning if the UI is displaying a different price than the inventory database.

The account server adds the track to the user's invoice and constructs the instructions needed to download the track. The instructions are returned as an XML document. The UI passes the XML to the TDM. The TDM requests a license for the track using the WMSDK or similar process. The WMSDK contacts the license server. The license server verifies with the account server that the user purchased the track. If acceptable, a license is returned to the WMSDK, and a success code is returned to the TDM. The TDM downloads the file from the content server, using a Content Delivery Network (CDN) as an "edge server" for example. The content server/CDN contacts the account server to authorize the download. The TDM contacts the account server to confirm successful delivery.

Figure 5:
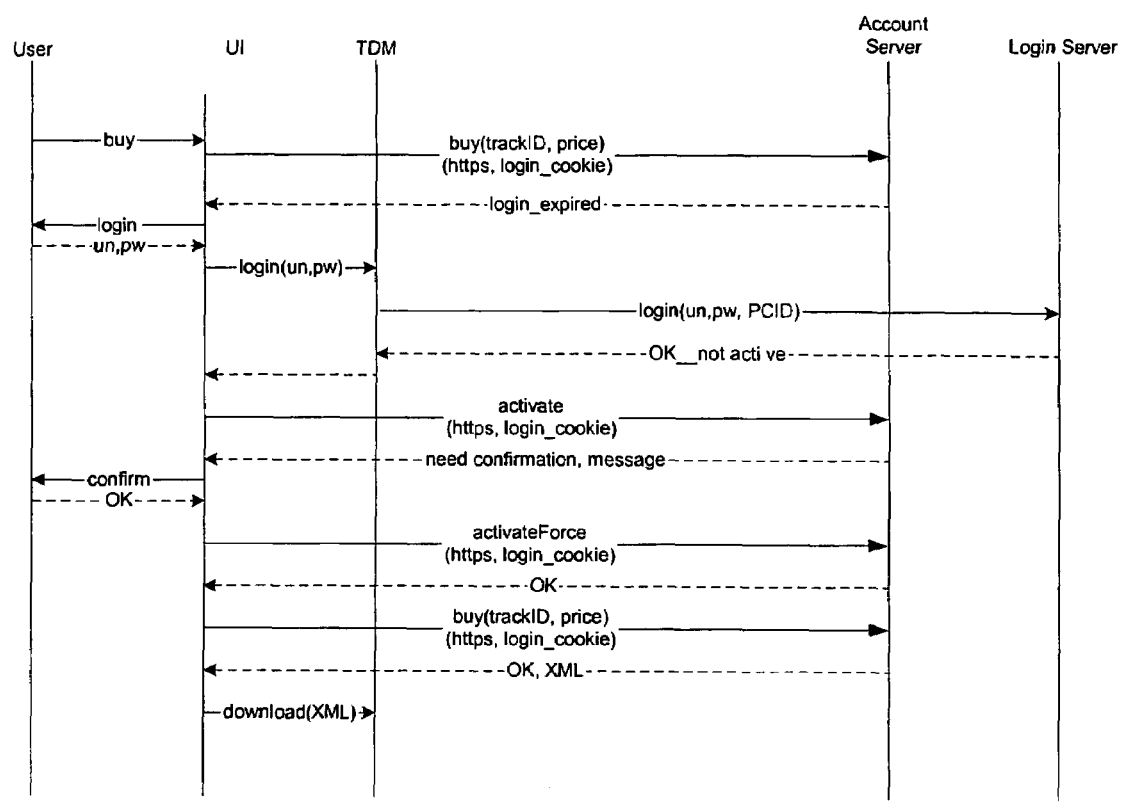
FIG. 5 is a ladder diagram illustrating communication for a track purchase according to an alternative embodiment.

FIG. 5 is a ladder diagram illustrating communications among components of the architecture 100 shown in FIG. 3 to execute a track purchase according to an alternative embodiment. The user clicks the buy button. A "buy" message is sent over https to the account server. This message passes the secure login cookie (which identifies the user) as well as the identifier of the track to be purchased and the displayed purchase price (in case it is different from actual purchase price). In this embodiment, the account server has determined that the user's login has expired. An error code is returned, forcing the user to re-login. The UI collects the username and password and forwards them to the TDM, which calculates the PC Identifier from the hardware profile and sends the login request to the login server over https.

On a valid login, the login server obtains the credentials from the account server as before. Embedded in the credentials is the status of the PC activation (activated, not activated). In this example, the PC is not activated. The UI must activate the PC before the purchase can proceed. The activate message is sent to the account server. In this example, the account server is configured to require that the user confirm the activation of a new PC. A return code and messaging is returned to the UI. The UI constructs the appropriate confirmation box for the user. The activation is retried following confirmation with a flag that forces activation without further confirmation. The "buy" request can now be sent to the account server. An XML document describing how to download and license the content is returned. This document is passed to the TDM for prosecution.

Figure 6:
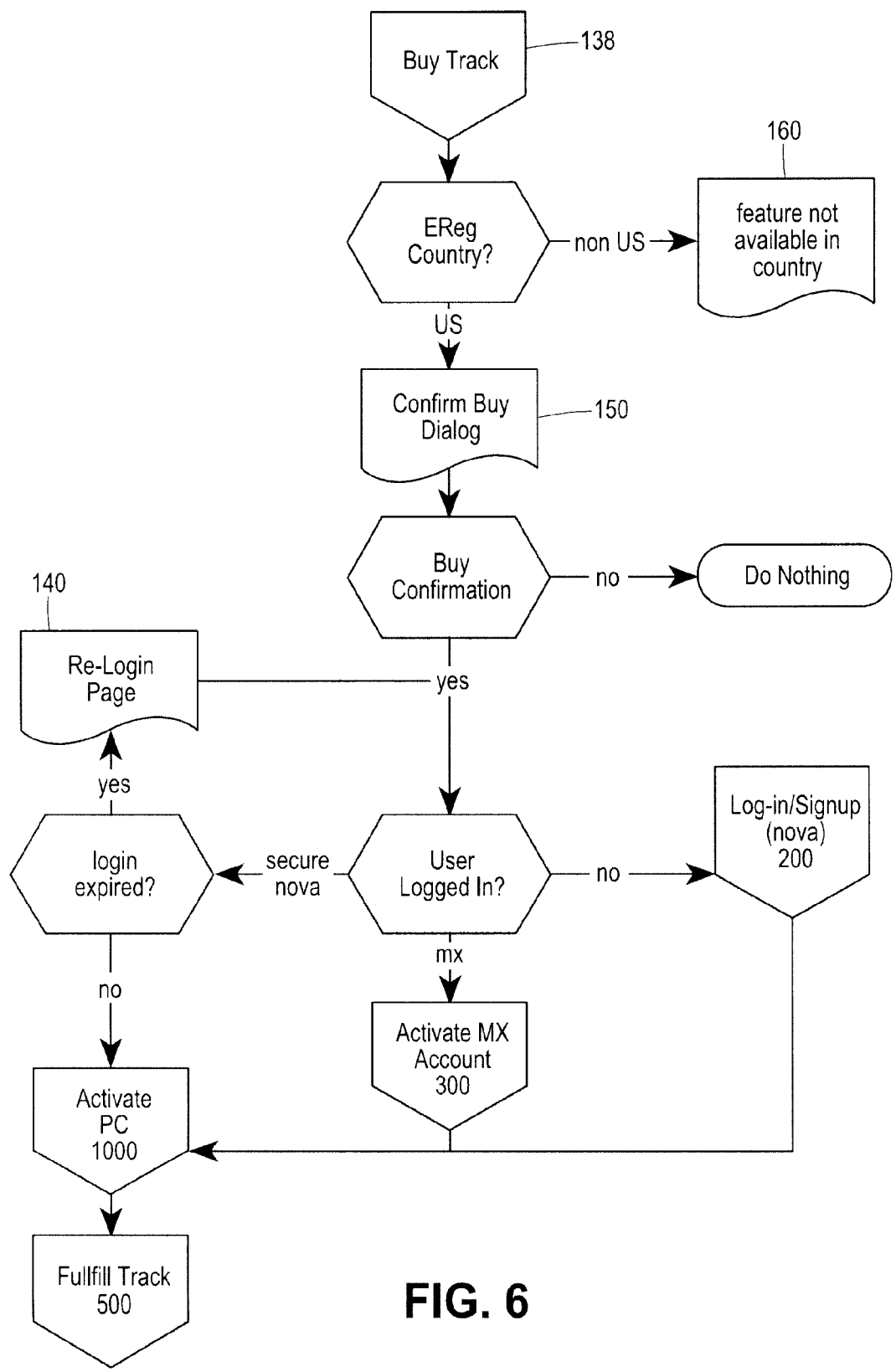
FIG. 6 is a functional flow diagram of a track purchase process.
Figure 15:
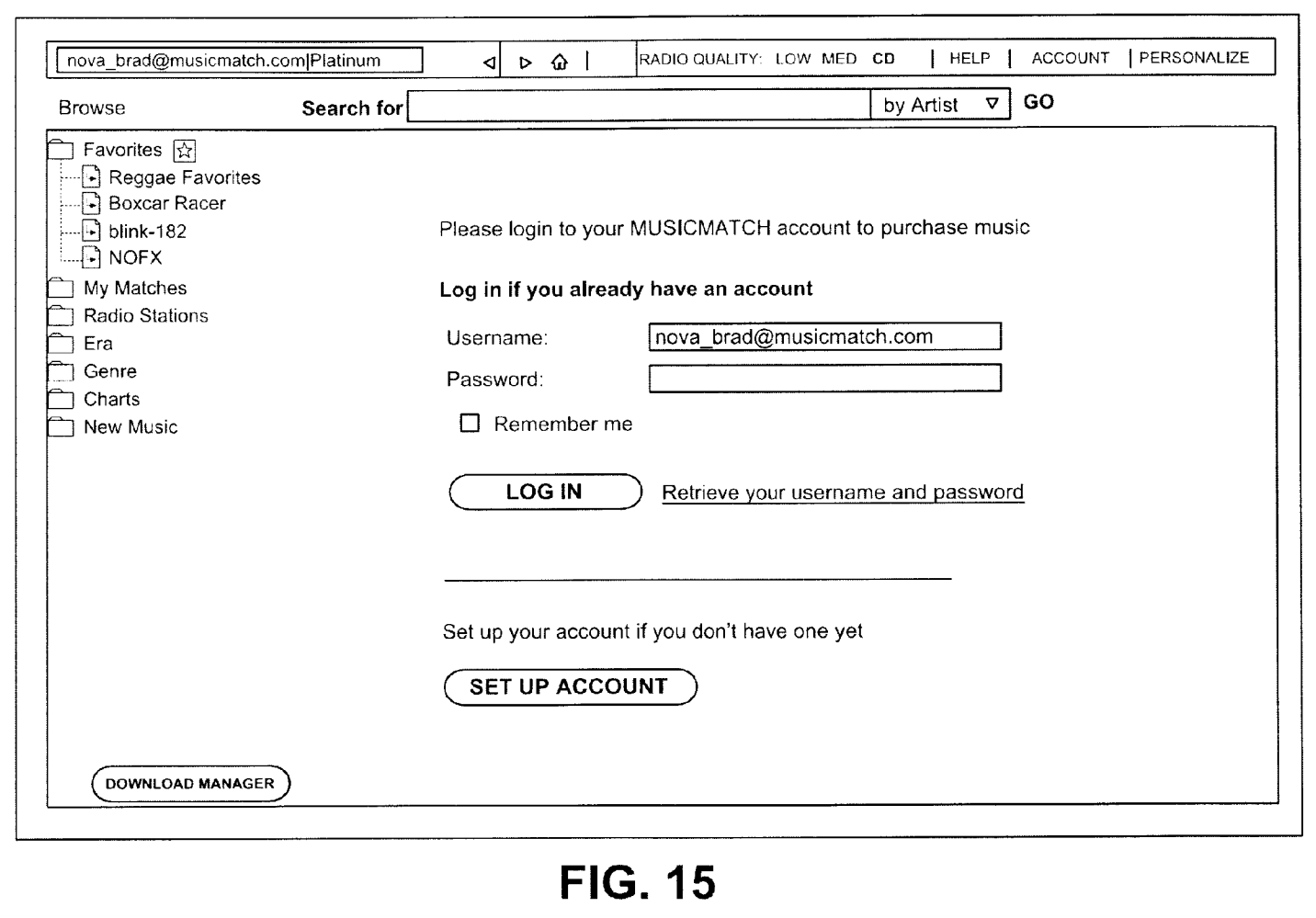

FIG. 6 illustrates a functional flow of a download purchase process 138. The user is presented with "buy" buttons whether logged in or not. If the user clicks this button, his or her Country as reported from the jukebox electronic registration is checked. A "sorry" page is displayed if he or she is non-US (160). For US users, a confirmation dialog is displayed (150). If the user confirms the purchase, his or her login state is determined. Users that are not logged in are offered the option to login or create an account (200). MX users are offered the option to activate their account for download purchases (300). The session expiration is checked for users with accounts. A re-login page, illustrated in FIG. 15, is displayed for users with expired sessions (140). These users must re-enter their password before purchasing the track. Once login is validated, the user's PC is activated if necessary (1000) and the track order is fulfilled (500).

Figure 7:
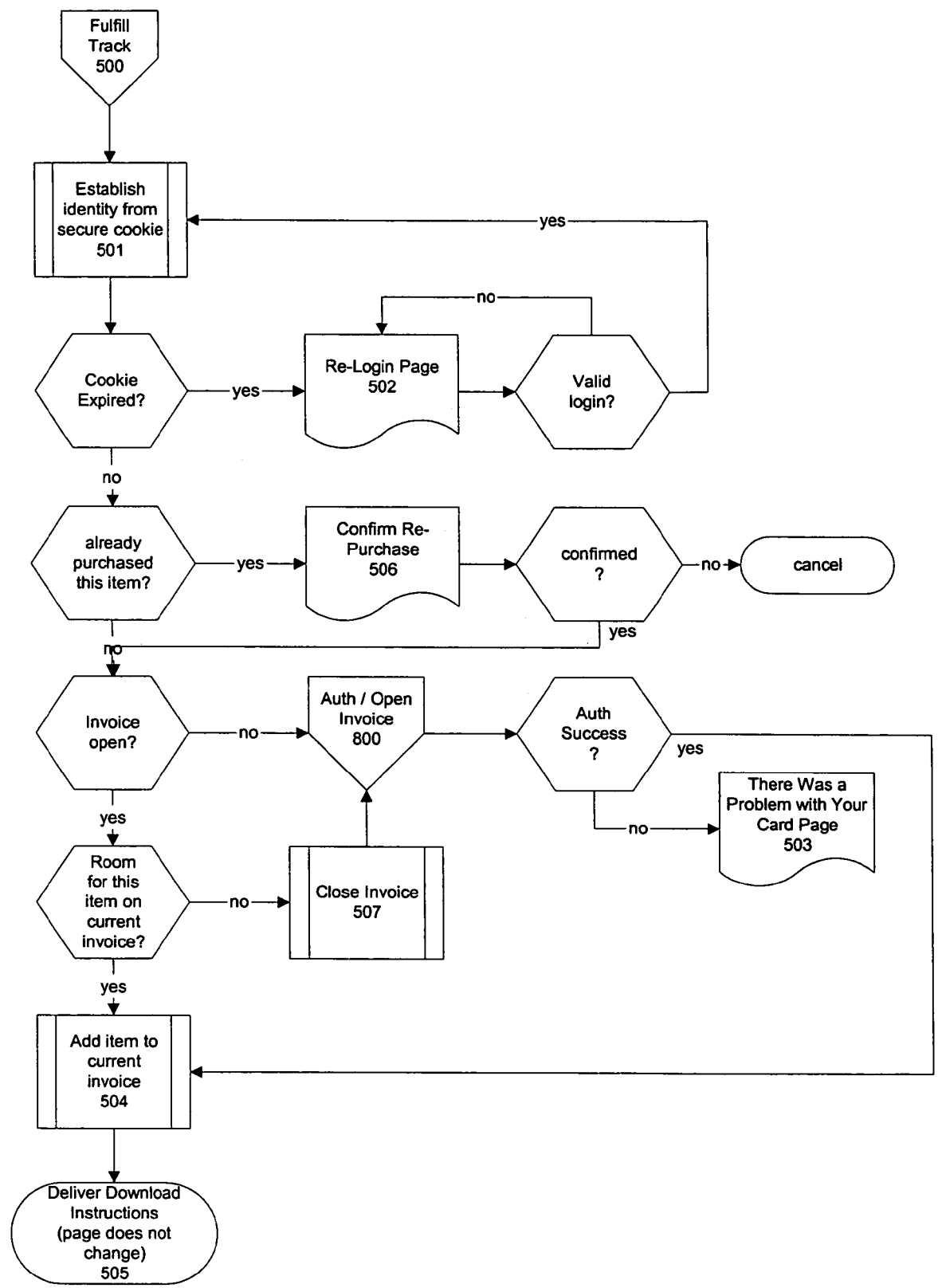
FIG. 7 is a functional flow diagram of a track fulfillment process.

FIG. 7 is a functional flow diagram of a fulfillment process 500. The fulfillment of a track commences with the identification of the user from the secure cookie (501). This cookie embodies the authorization for track purchases and includes an encrypted user Id and authorization timestamp among other things. If the cookie is expired, the user must re-login (502) to complete the purchase. Expiration is also checked when login state is determined, but is rechecked here because the transaction could be drawn out by the confirmation dialog (150).

If the user does not currently have an open invoice, an invoice is opened. Opening the invoice (800) includes authorizing a credit card payment of the standard invoice amount, or the amount of the item (whichever is larger). If the authorization fails, a page is displayed (503) to notify the user of the failure and includes links to account management to correct the issue. If an invoice is already open, a check is performed to ensure that there is room for the new item on the invoice: the new item plus the current balance will not exceed the authorization amount. If there is insufficient room on the invoice, the invoice is closed (900) and a new invoice is opened (800). Closing an invoice may include charging the credit card. Once the item is added to an authorized invoice, it may be delivered to the customer (505).

Figure 8:
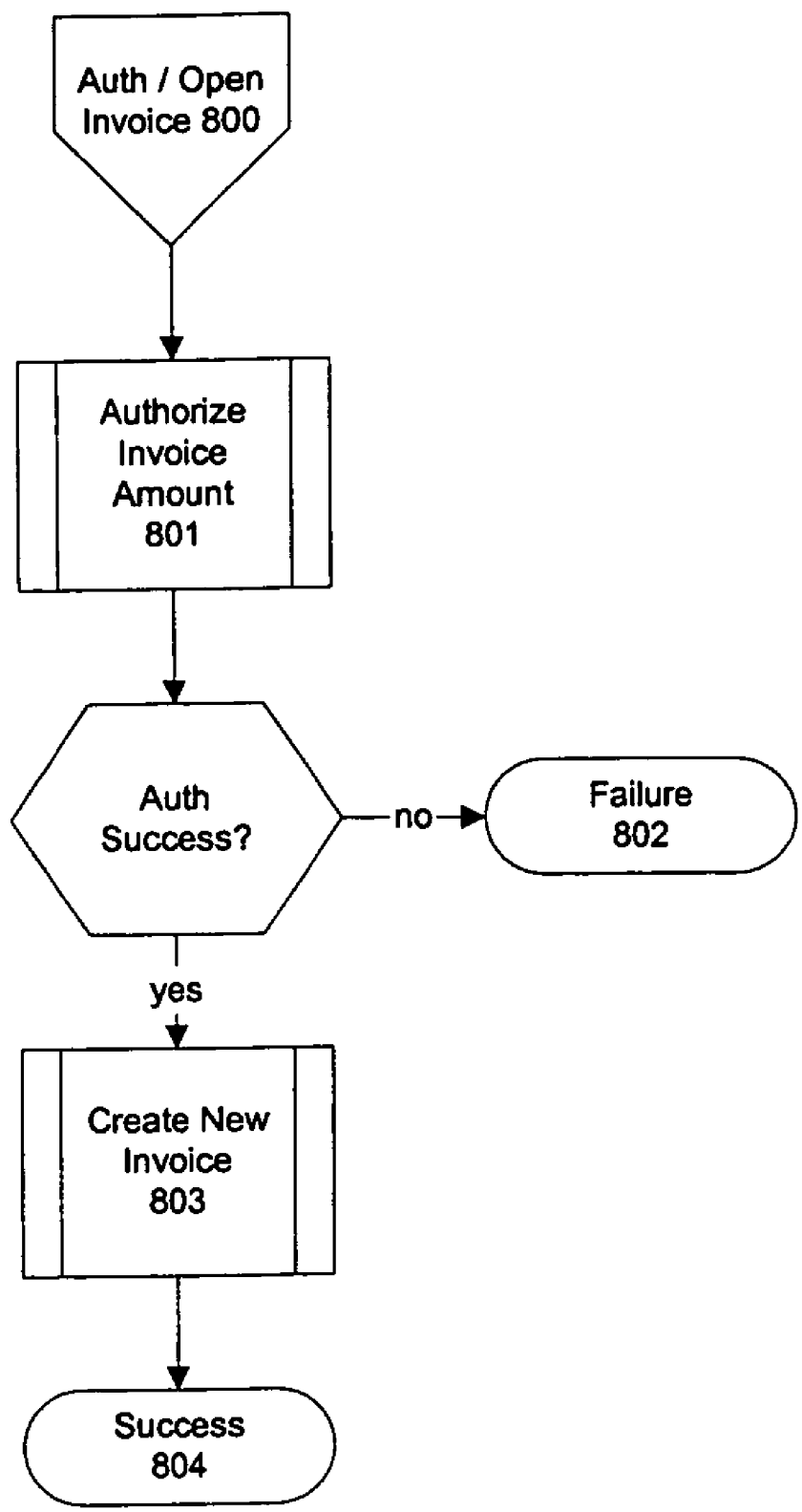
FIG. 8 is a functional flow diagram of an invoice authorization and creation process.

FIG. 8 illustrates an invoice opening process 800. To open a new invoice, the system authorizes a credit card payment for the amount of the invoice (801). This is the larger of the requested amount or the standard invoice size. If the authorization is declined, the system does not open the invoice (802). The system can optionally insert security logic into the authorization process (801), for example, if a great deal of activity is detected on the account, the system fails an authorization and flags that a CVID is required. This forces the user to enter the security code from the credit card before authorizing additional purchases. Conversely, the system may decide, for reliable customers, to reduce the security constraints. That is, the invoice may be allowed to grow beyond its authorization amount, pre-authorizations may be suspended for the user, or new invoice limits for size and maximum age may be set. If the authorization succeeds, a new invoice is created (803) and associated with the authorization.

Figure 9:
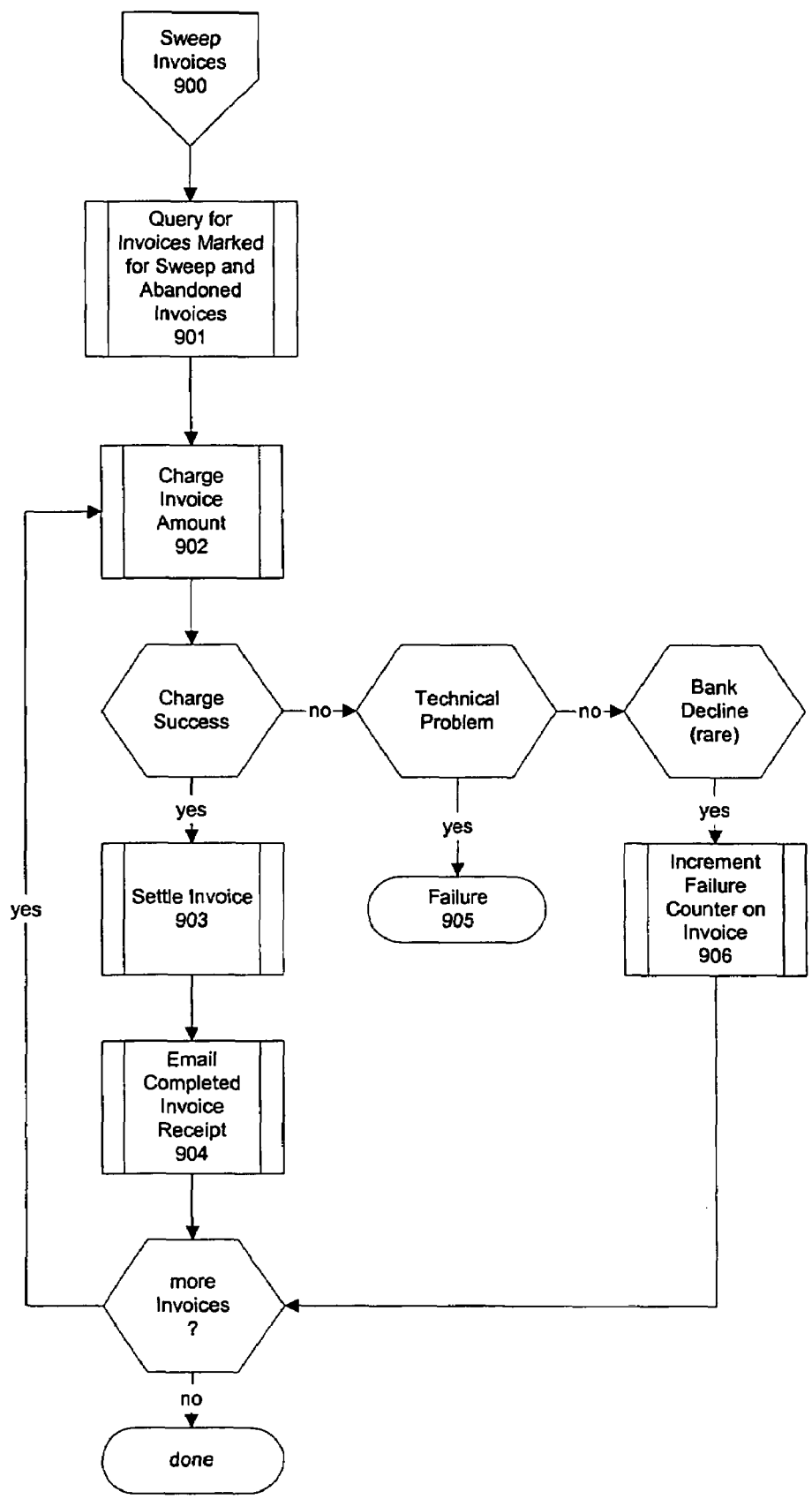
FIG. 9 is a functional flow diagram of an invoice sweep process.

FIG. 9 illustrates an invoice closing process 900. Invoices are 'marked for sweep' as they become filled to the level of the corresponding credit card authorization. Periodically, a batch process runs that queries for invoices that are marked for sweep or have not been added to for some threshold of time (901). The amount of the invoice is charged to the card (settled) (902). If the settlement fails for a technical reason, such as a temporary network issue, the invoice can be marked for batch settlement. In the very rare case of a decline to settle an authorized transaction, a failure count is incremented such that the settlement can be retried later (906) and the user is not allowed to create a new invoice. Assuming the typical case of a successful settlement, the invoice is marked as closed (903) and an email receipt (904) is generated and sent to the user. For batch processing, a process can be run periodically that queries the system for invoices that are open and older than a given threshold. The threshold is less than the valid lifespan of a credit card authorization. The invoices are charged and closed.

The system allows users to reset a forgotten password to a new value, but will not deliver the forgotten password to the user. They system verifies that the user has knowledge of the email address of a valid user and has control of the email account. For extra security, in one embodiment the system requires that a user re-enter credit card information or CVID after retrieving a lost password.

Figure 10:
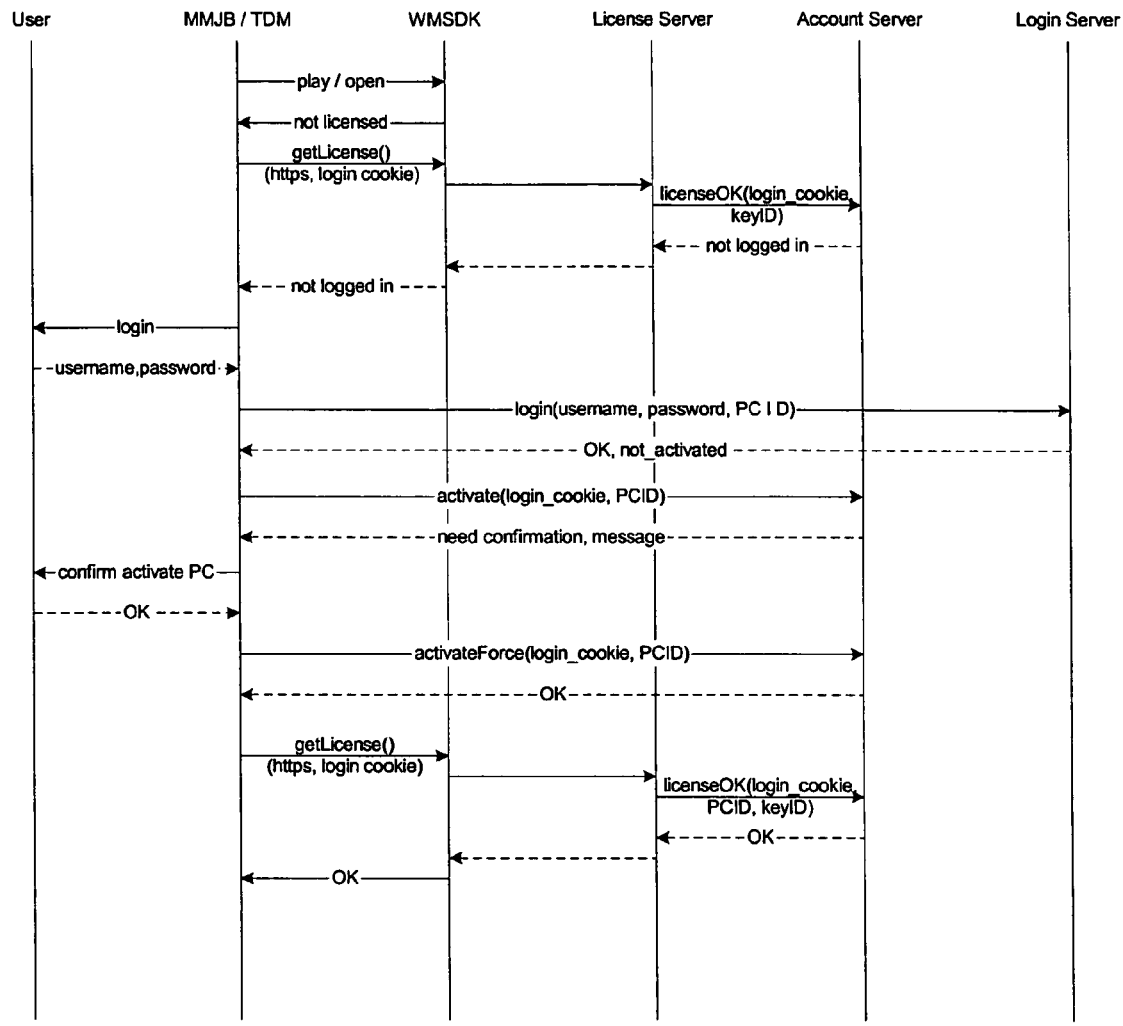
FIG. 10 is a ladder diagram illustrating a login and authorization process in an online jukebox system.

FIG. 10 is a ladder diagram illustrating communications for licensing a track. The Jukebox attempts to play/burn/import a WMA file. The Jukebox checks with the WMSDK to see if the file must be licensed. In this example, the file needs to be licensed. The Jukebox requests a license using the URL embedded in the DRM file. This is an https request and passes the login cookie. The license server receives this request and contacts the account server to determine if the license should be granted. In this example, the account server determines that the user is not logged in. This triggers the login process.

The login server returns both the login status and the activation status of this PC. If the PC is not activated, the Jukebox sends the activate message to the account server. In this example, the account server is configured to require that the user confirm the activation of a new PC. A return code and messaging is returned to the Jukebox. The Jukebox constructs the appropriate confirmation box for the user. The activation is retried following confirmation with a flag that forces activation without further confirmation. The Jukebox can now reissue the getLicense call.

For downloads, enhanced performance can be achieved by storing the first N seconds of audio data in a semi-clear (i.e. very light encryption) format, such as can be used for track "samples." While the first N seconds of data is being played, a background thread then opens DRM'd content. After the DRM file is opened, and the semi-clear content has finished playing (this may be before N seconds), the DRM-protected content is seamlessly transitioned to and rendering is continued from there.

When a track is provided into JB system, the decoder will first identify it as a DRM track, seek to the end of the track, "grab" the offset (i.e. the N seconds), and then seek to there and create a data stream starting point. In a specific embodiment, a custom tag called MM/ActualTrackDuration of type WMT_TYPE_DWORD can be created which will contain the actual track time in milliseconds. Note that the entire metadata set must be duplicated in the clear N seconds audio data portion of the file as well as the DRM'd content area. It must be in the clear portion in order to optimize performance related to fetching tags, and it must exist in the protected area in order to maintain interoperability.

Accordingly, in one embodiment, when a purchased track is downloaded, in addition to downloading the license and the DRM track, an N second (unprotected) clip associated with that track is first downloaded. The N second clip is first played. Meanwhile, in a background thread the actual DRM content is opened. The DRM content must be opened within N seconds At the end of the N second clip, the download process "jumps over" to the DRM track which has been opened already, and content downloading continues. Thus, in an embodiment the DRM track is appended to an associated N second clip at the location (time N) in the DRM track at which the clip ends.

Figure 11:
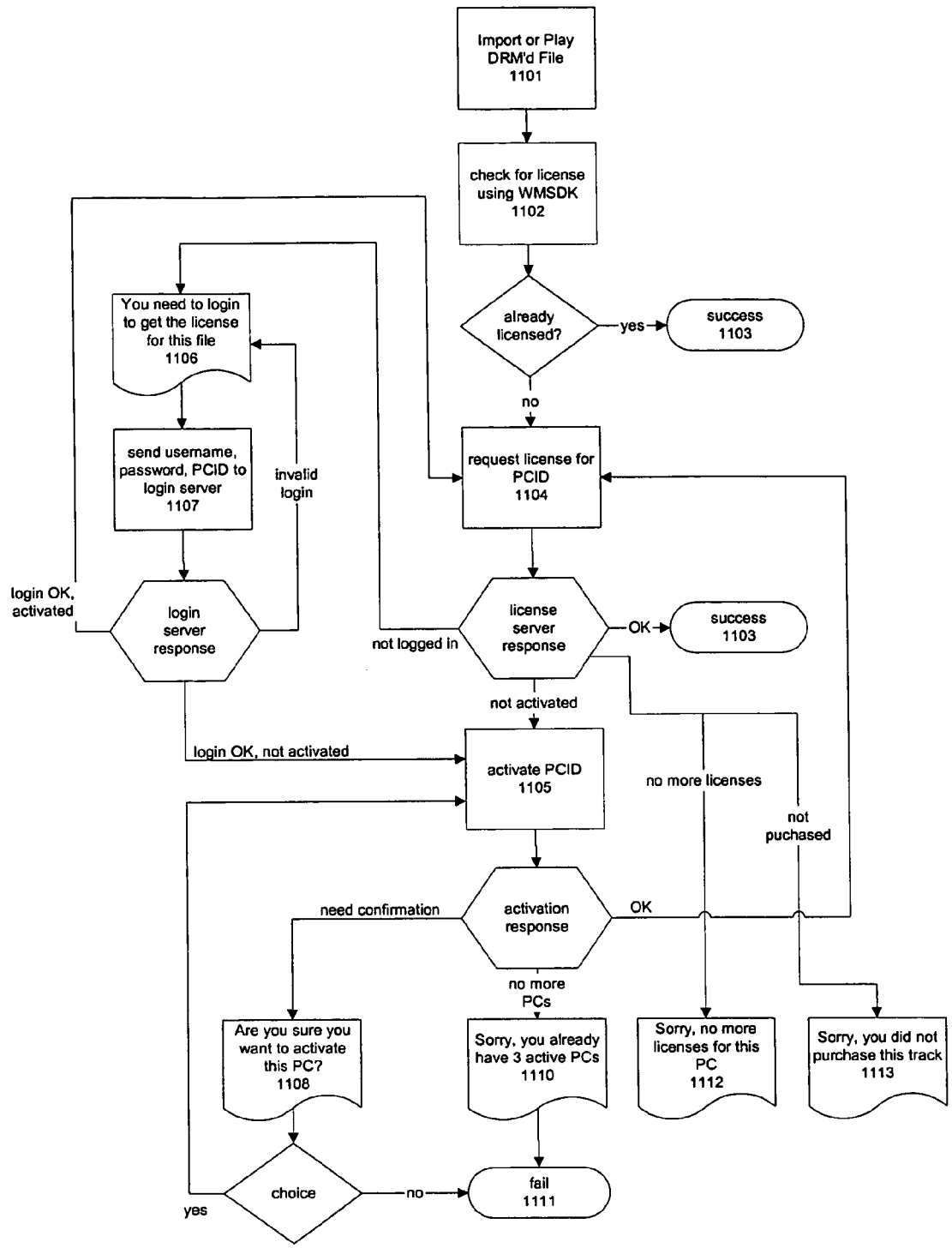
FIG. 11 is a functional flow diagram of a DRM-compliant file import/play process in accordance with an embodiment.

FIG. 11 is a flowchart of a method of importing/playing a file subject to DRM requirements 1101. The user opens an unlicensed DRM file using JB (1101). JB checks the license status of the file (1102). If the file is already licensed, JB can play/burn or otherwise access the contents of the file (1103). If the file is not licensed, JB will request a license using the URL embedded in the file and passing extra information including the PCID of the current machine (1104). The login cookie that rides this request identifies the user. The license server (through the account server) requests a license for the particular track, for the particular user, for the particular PC.

The license server either issues the license (1103) or returns an error that describes why the license was not issued (1106, 1112, 1113). If the user is logged in, but has not yet activated, the PC is activated (1105). If the user is not logged in, the user must login before a license can be obtained (1106, 1107).

The response from the login server includes the activation state of the current PC. If the response indicates that the login succeeded and the PC is already active, JB re-requests the license (1104). If the response indicates that the login succeeded but the PC is not activated, the PC is activated (1105). If the PC activation (1105) may require explicit confirmation (1108), or it may fail if the maximum number of PCs have already been allocated (1110). If PC activation succeeds, the license request is retried.

Figure 12:
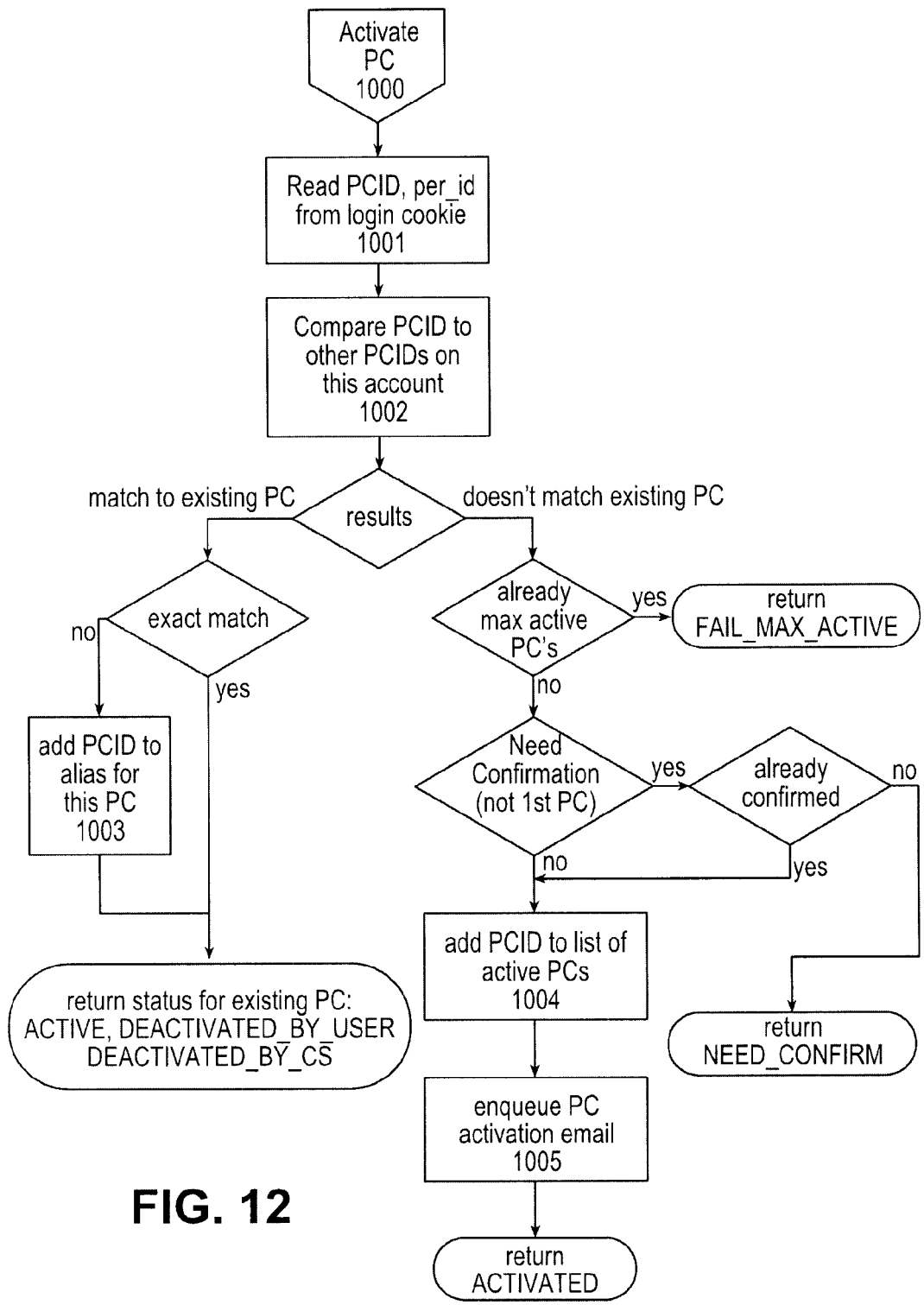
FIG. 12 is a functional flow diagram of a computer activation process.

FIG. 12 is a flowchart of a PC activation request process 100. The activation request is sent via https to the account server. The account server reads the per_id and PCID from the login cookie (1001). The PCID is compared against other PCIDs in the account (1002). The PCIDs may not match exactly if the user has reconfigured hardware. The PCID could be stored as a new "alias" for this PC if it is determined that the PCID is a match, but not an exact match (1003). The activation status of the existing PC is returned. Existing PCs may be active, deactivated by the user, or deactivated by customer support. If the PCID does not match an existing PC, the check is made to see if the maximum number of PCs is already active. If so, an error is returned.

Next, business logic is checked to see if the user must confirm the activation of a PC. In one embodiment, the first PC is silently activated, but the user must confirm activation of PCs two and three. If a confirmation is needed, a special return code is generated along with the text of the messaging to use. The activation request can be flagged to indicate it is in response to a user confirmation. In this case, the activation proceeds. The PCID is added to the list of PCs associated with the account and marked as activated (1004). An email is generated to confirm the activation and to help educate the user about activation issues (1005).

Account creation and activation are integrated into the track purchase process: for example, when an unauthorized user attempts to purchase a track, they are encouraged to activate or set up an account. If they succeed in setting up the account, the purchase is completed. Track purchase is, by default, a cart-less "micropay" system: i.e. the credit card is authorized as part of setting up an account. As each track is purchased, it is added to an open invoice associated with the account. When the invoice reaches a certain size or age, the credit card is charged and/or the invoice is closed. A separate shopping cart purchase process could allow users to purchase tracks using a cart and checkout.

Figure 13:
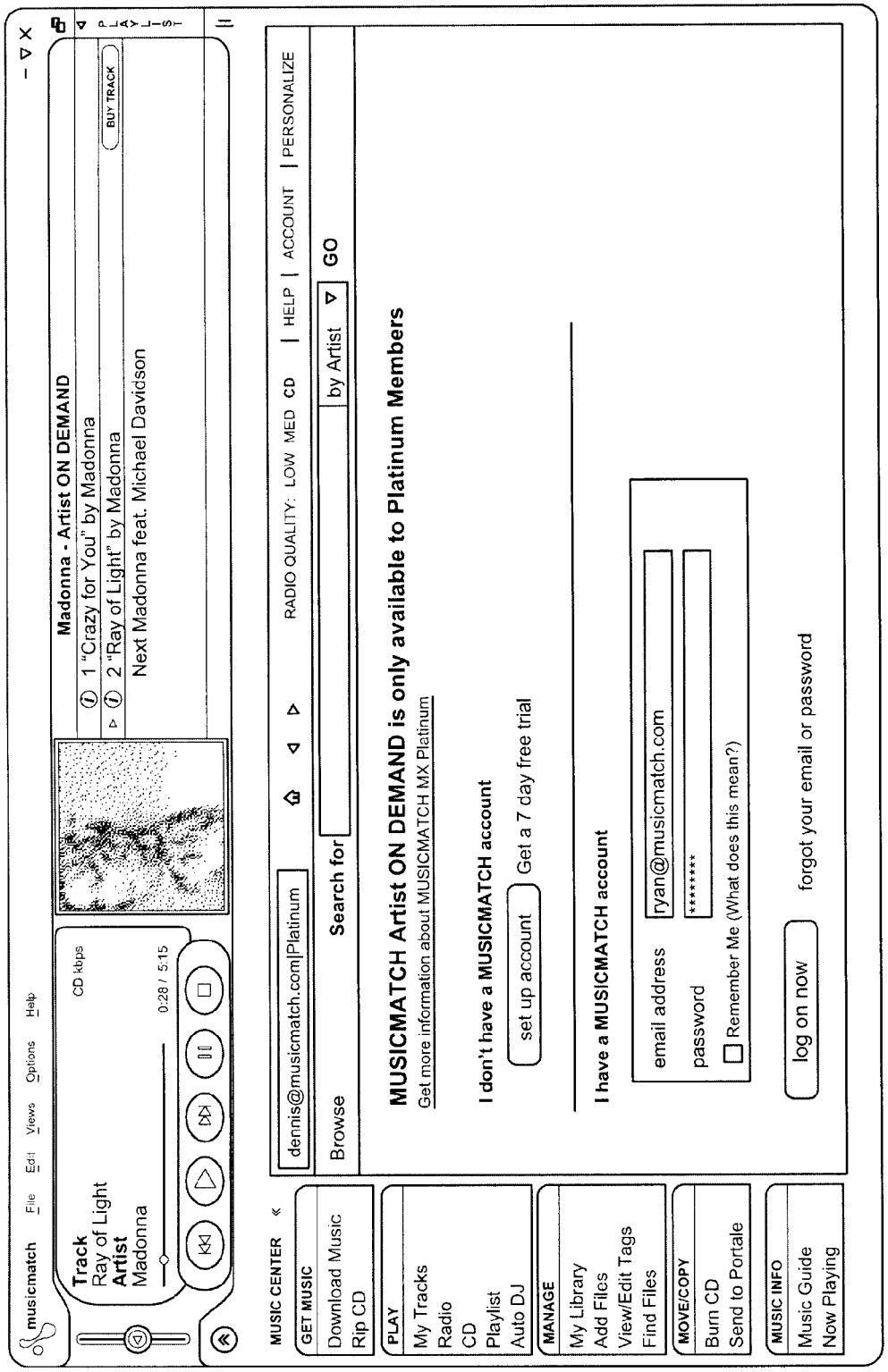
FIG. 13 shows a user interface in accordance with an embodiment of a jukebox system.
Figure 14:
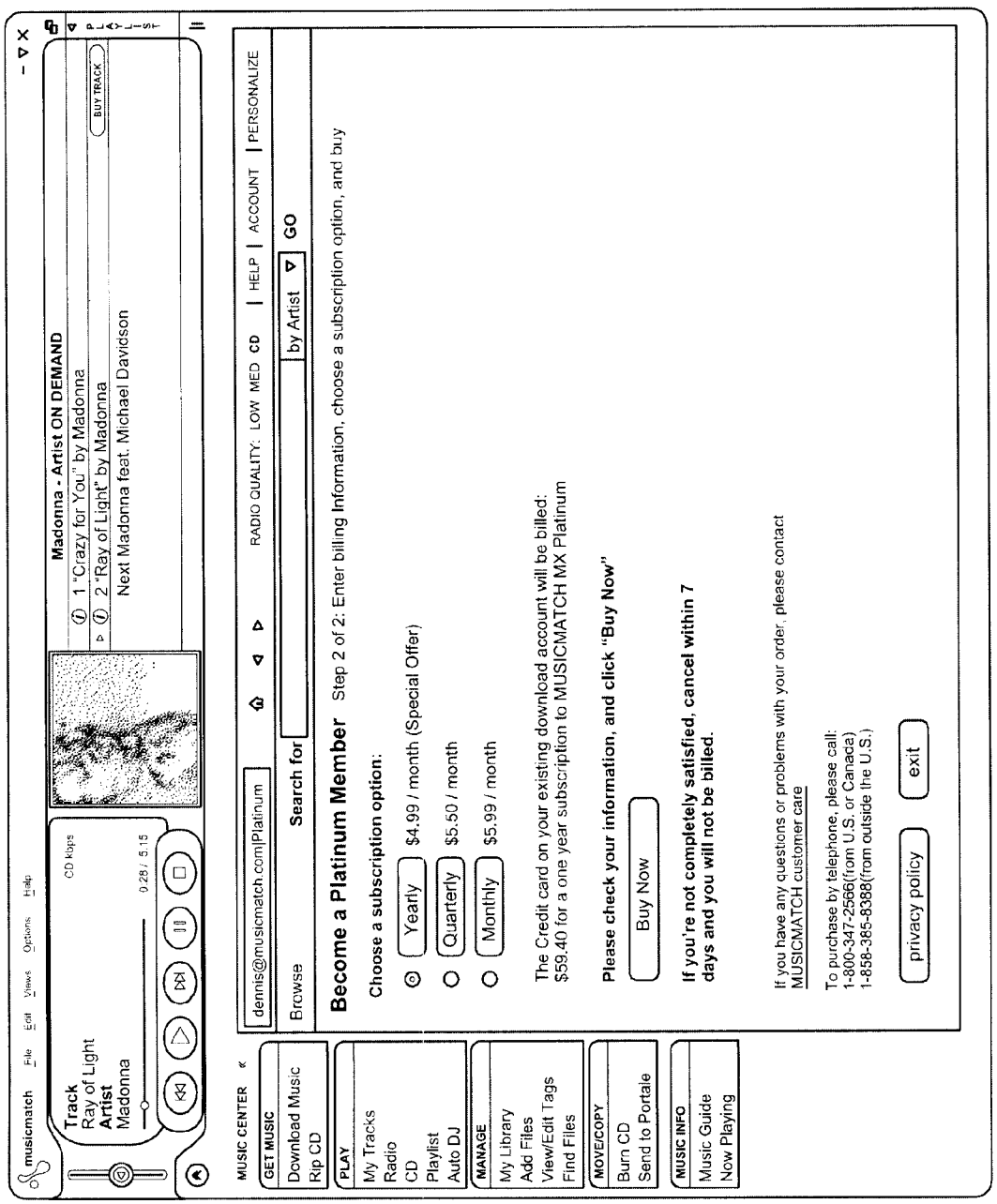
FIG. 14 shows another user interface in accordance with an embodiment of a jukebox system.

When a logged-out user accesses a service of the JB system, they will be presented with a Login/Signup page, as shown in FIG. 13. Users with accounts will be expected to log in from this page. Users without accounts will be enabled to sign up. The Signup process is customized to offer whatever service the user has just accessed, as shown in the example depicted in FIG. 14. Customers from countries that are not eligible for a service will see a message to that effect when they access the service. This is based on the country reported from JB (which uses the EREG data). These users will not see a SignUp button. If the Country reported by the Jukebox is incorrect, the system aborts the account creation process or changes offerings if a user reports an ineligible country in the Billing Info page. Popup info pages handle detailed product marketing.

Figure 16:
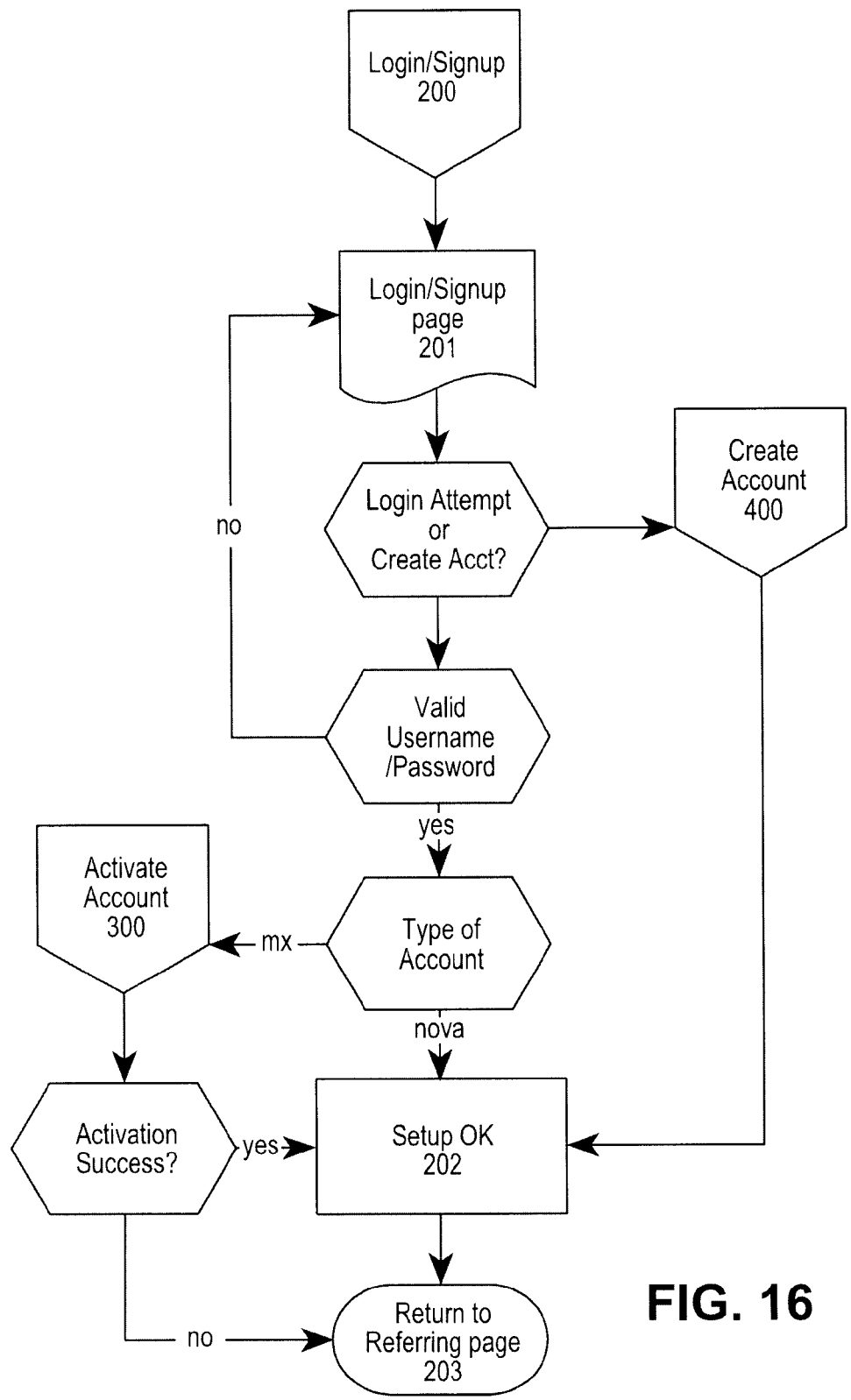
FIG. 16 is a functional flow diagram of a login/signup process.
Figure 17:
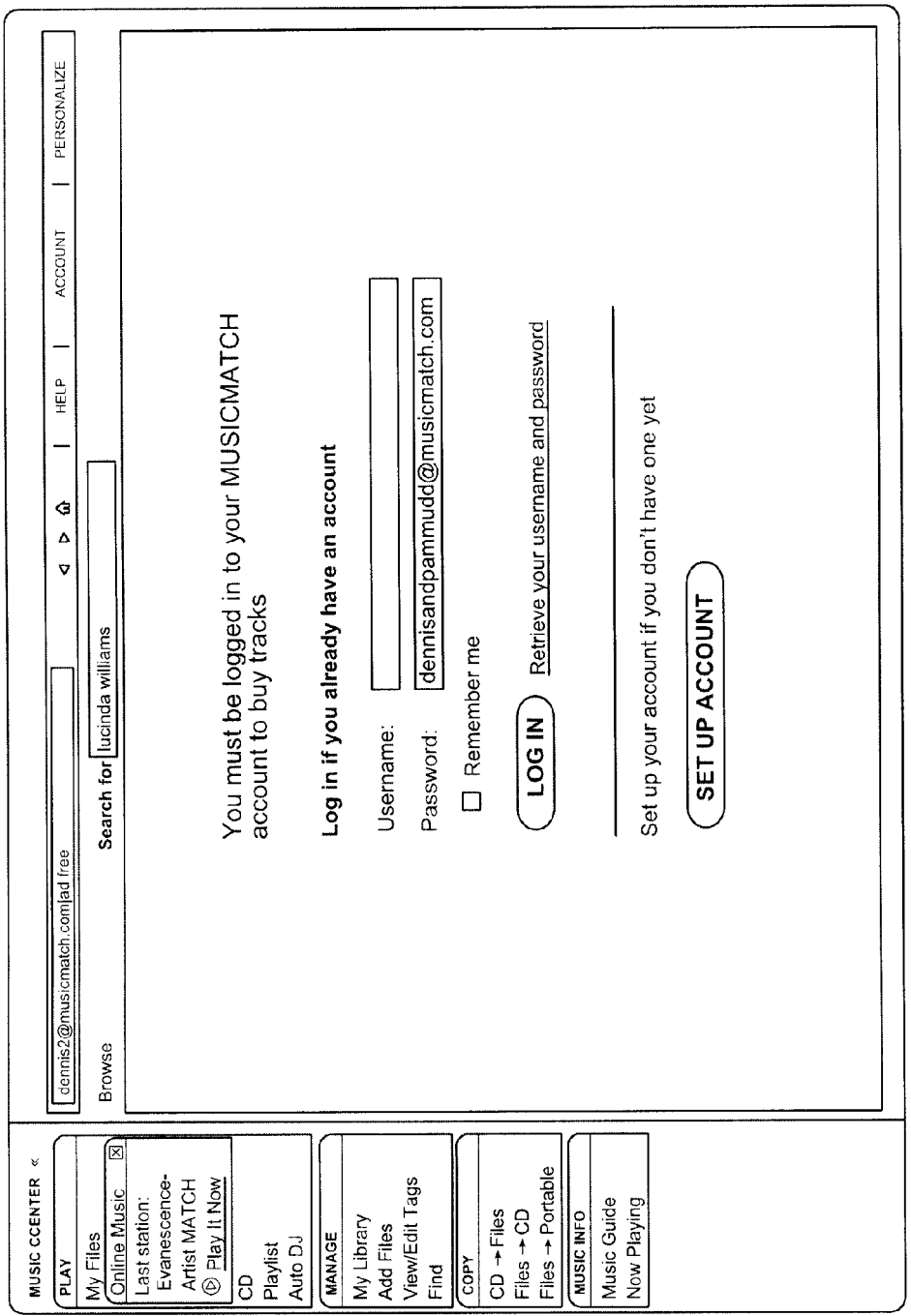
FIG. 17 shows a login user interface.

FIG. 16 is a functional flow diagram of a login/new account setup process 200. Users that access a Nova feature and are not logged in see a page allowing them to login or initiate the account creation process (201). If the user logs into an account, he or she enters the process to activate his or her account (300). A new user can create an account (400) and become logged in to the JB system. All paths through account creation or login, whether successful or not, eventually lead back to the referring page (203). If the creation or login was successful, this will result in the completion of track purchase. The Login/Setup Page (201), as illustrated in FIG. 17 is displayed when a user accesses a feature that requires login. The messaging at the top of this page will change depending on the context.

Figure 18:
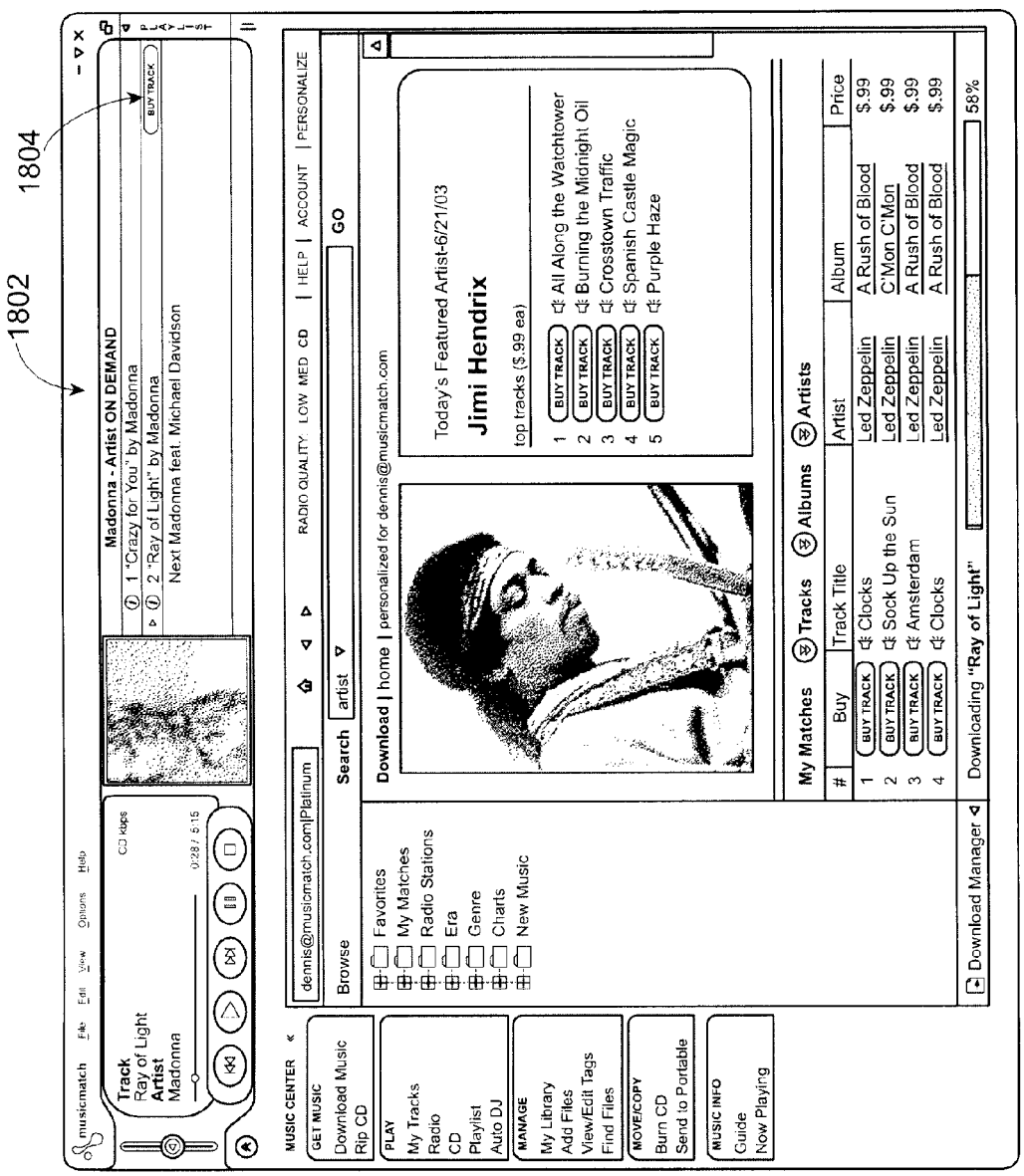
FIG. 18 is an exemplary user interface illustrating an integrated radio service, download store, and content management control.

FIGS. 18-21 show various UIs for controlling a JB in accordance with exemplary embodiments. FIG. 18 is a UI 1800 of a radio service in accordance with an exemplary embodiment. In this embodiment, the UI 1800 is displayed as a web page loaded into a web browser component that is integrated with the Jukebox. The web page includes scripts (e.g. JavaScript) that can control certain elements of the presentation, and which can post and respond to events without requiring interaction with the server that loaded the web page. In particular, the scripts running in the web page can perform the actions required of the UI 1800 to instigate a track purchase as outlined above. One skilled in the art will recognize that there are many possible presentations of the catalog of music available for purchase and that as is customary with web based systems of this sort, the presentations can be changed frequently without departing from core functionality. Such presentations can be built using web authoring tools and other known technologies for building web pages.

The UI 1800 includes a radio service display window 1802 that sequentially lists tracks as they are played in a radio session. Each track may be associated with an information control button, designated in FIG. 18 as an "i" that the user can select to be linked to further information regarding the track. Individual tracks, whether currently-playing or recently-played, may also be associated with a download and purchase function, as indicated by a "buy" button 1804 next to the track title shown in FIG. 18. In one embodiment, the user can highlight the entire track title, and if purchasing the track is an option, i.e., allowed by license or other mechanism, then the purchase function will appear. Downloaded tracks related to the radio service may be stored as other purchased and downloaded tracks.

Figure 19:
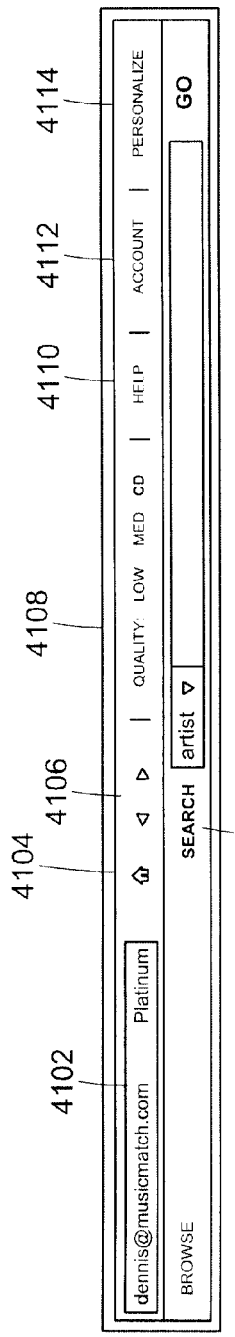
FIG. 19 illustrates a control bar for use in a user interface in accordance with one embodiment.

FIG. 19 shows an exemplary control bar. Control bar elements include a status window 4102. If the user is not logged in, the status window 4102 displays a "sign in" or similar message. If the user is logged in, the status window 4102 shows, user name | account type, if relevant. A home button 4104 takes the user to guide, radio or download home, depending on the entry point used. If the entry mode cannot be determined, (i.e. hyperlink from newsletter) the system assumes the download mode.

A back/forward button 4106 is provided. The back/forward button 4106 does not differentiate between mode, that is, the back button will navigate back through the page history switching modes as appropriate. A radio quality control 4108 allows a user to adjust the quality of the played content, such as "Low," "Med," and "CD" quality. A help button 4110 pulls up a help menu. An account button 4112 pulls up an account log in page. A personalize button 4114 pulls up a personalization process for opt-out users. For opt-in users, this allows the user to edit his or her profile. In one embodiment, the button takes the user to the favorites manager.

A search bar 4116 is a DHTML drop-down menu, with artist, album and track options. Artist search includes composers and works. Results show an artist hyperlink. Album search does not include fuzzy matching, and shows all exact match albums, listed according to popularity. Results show an album hyperlink and an artist hyperlink for returned results. Track search also does not include fuzzy matching, and shows all exact match track names, listed in terms of popularity. Results show artist and album hyperlinks in returned results.

Figure 20:
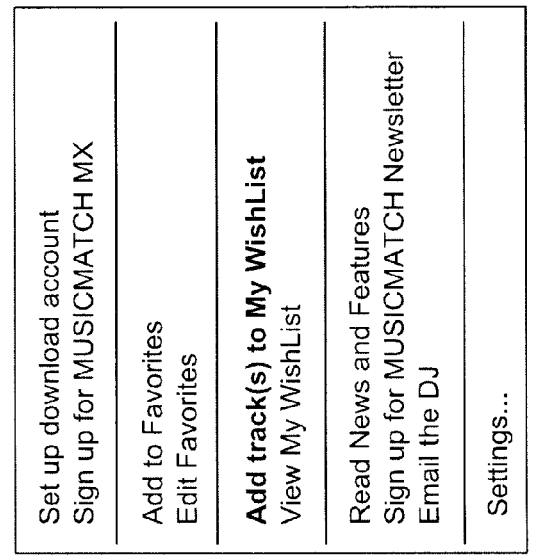
FIG. 20 shows an example user interface pull-down menu for setting up an account.
Figure 21:
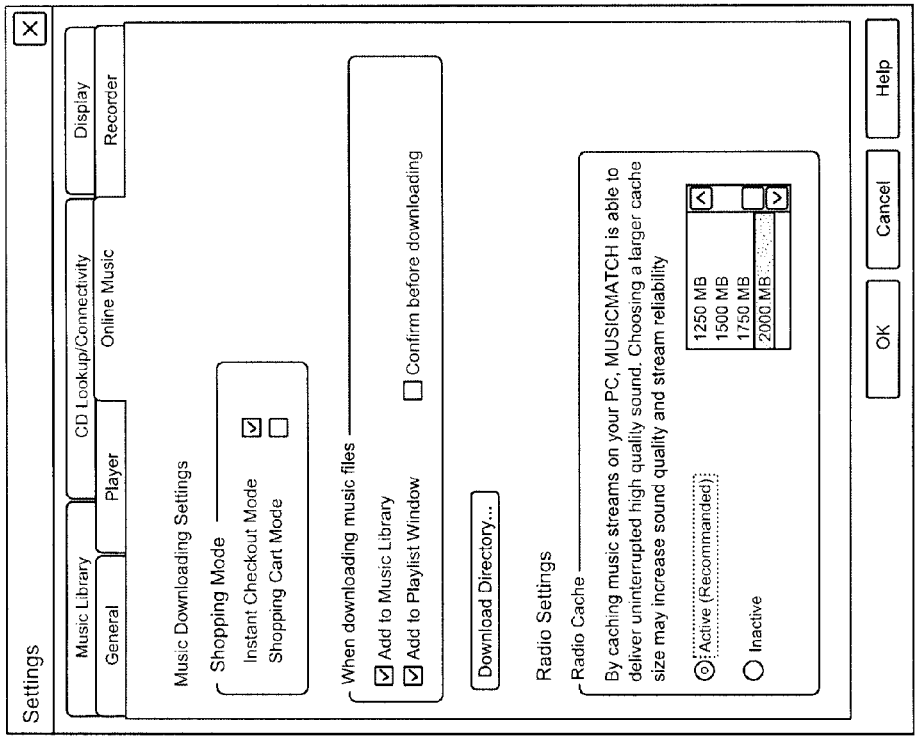
FIG. 21 shows an example user interface for controlling various settings of a jukebox system.

FIG. 20 shows an example UI pull down menu for setting up an account. FIG. 21 shows an example UI for controlling various settings.

Although a few embodiments have been described in detail above, other modifications are possible. The functional or logic flows depicted herein do not require the particular order shown, or sequential order, to achieve desirable results. Other embodiments may be within the scope of the following claims.

The invention claimed is:

1. A system comprising:
a radio sequence generator that determines a sequence of media content to be transmitted to a user device for a radio session at the user device;
a content server that serves the media content for the radio session in accordance with the sequence determined by the radio sequence generator;
a radio sequence server that serves a content list to be displayed in a radio session portion of a user interface at the user device, the content list comprising entries corresponding to currently-playing and previously-played media content of the radio session, each entry is selectable to indicate a desire to purchase the radio session media content corresponding to the entry;
an account server that receives a signal to purchase a selected one of the radio session media content having an entry in the content list;
the content server that further downloads the selected radio session media content to the user device according to the signal to purchase the selected radio session media content; and
at least one user interface server that serves the user interface for display at the user device, the user interface comprising the radio session portion, a search portion to receive user input indicative of a request to search for media content independent of the radio session and to display search results including at least one indicia selectable to purchase media content other than the radio session media content, and at least one portion to receive user input indicative of a request to experience media content other than the radio session media content.

2. A system in accordance with claim 1, further comprising a license server, in communication with the account server, that obtains at least one license for the selected radio session media content.

3. A system in accordance with claim 1, further comprising a payment processor, in communication with the account server, that processes the user's credit card information for the purchase of the selected radio session media content before the selected radio session media content is downloaded.

4. A system in accordance with claim 1, the user interface further comprising a graphical representation of the radio session.

5. A system in accordance with claim 4, wherein the integrated user interface includes a portion to display a folder structure that includes a file containing purchased media content downloaded by the content server to the user device, the portion of the integrated user interface further including controls to receive user input indicative of a request to navigate through the folder structure to access the downloaded and saved file containing the purchased media content.

6. A system in accordance with claim 1, wherein the content server operates concurrently with providing the radio session.

7. A system in accordance with claim 1, wherein the user interface includes media player controls.

8. A system in accordance with claim 7, wherein the media player controls include a forward control for accessing a next digital radio representation of media content from the content server.

9. A system in accordance with claim 8, wherein the next digital radio representation of media content is determined by the radio sequence server in accordance with the determined sequence.

10. A system in accordance with claim 1, wherein the media content is a music track.

11. A system in accordance with claim 1, wherein the radio sequence generator, the content server, the radio sequence server, the account server and the at least one user interface server are implemented as one server.

12. A system in accordance with claim 1, wherein the radio sequence generator, the content server, the radio sequence server, the account server and the at least one user interface server are implemented as two or more servers.

13. A system in accordance with claim 1, further comprising:
the account server that receives a signal to purchase a selected one of the media content other than the radio session media content; and
the content server that downloads to the user device the selected other media content purchased by the user.

14. A system in accordance with claim 13, wherein the radio sequence generator, the content server, the radio sequence server, the account server and the at least one user interface server are implemented as one server.

15. A system in accordance with claim 13, wherein the radio sequence generator, the content server, the radio sequence server, the account server and the at least one user interface server are implemented as two or more servers.

16. A method executed by at least one server computer, each server computer having at least one processor and memory, the method comprising:

transmitting, by the at least one server computer and in accordance with a determined sequence, media content to a user device for a radio session at the user device;
transmitting, by the at least one server computer, a user interface and information to be used to display a content list in a radio session portion of the user interface at the user device, the content list comprising entries corresponding to currently-playing and previously-played media content of the radio session, each entry is selectable at the user device to purchase the radio session media content corresponding to the entry, the user interface further comprising a search portion to receive user input indicative of a request to search for media content independent of the radio session and to display a set of search results, the search results including at least one indicia selectable to purchase media content other than the radio session media content and at least one portion to receive user input indicative of a request to experience media content other than the radio session media content;
receiving, by the at least one server computer, a signal to purchase a selected one of the radio session media content; and
causing a download, from a content server to the user device, of the selected radio session media content purchased by the user according to the signal to purchase the media content.

17. A method in accordance with claim 16, further comprising making suggestions of media content other than the radio session media content and purchased radio session media content to receive and play.

18. A method in accordance with claim 16, further comprising receiving credit card information for purchasing the selected radio session media content before downloading the selected radio session media content.

19. A method in accordance with claim 18, further comprising validating the received credit card information before downloading the selected radio session media content.

20. A method in accordance with claim 16, wherein receiving the signal to purchase the selected radio session media content includes:
receiving a signal corresponding to a displayed buy button in the user interface and information identifying the selected radio session media content.

21. A method in accordance with claim 16, wherein downloading the selected radio session media content purchased by the user occurs such that the selected radio session media content is to be received at the user device while the user device is receiving and playing media content.

22. A method in accordance with claim 16, wherein the media content is a music track.

23. A method in accordance with claim 16, wherein the at least one server computer comprises the content server.

24. A method in accordance with claim 16, wherein the at least one server computer comprises a plurality of separate server computers.

25. A method in accordance with claim 16, wherein the at least one server computer comprises a single server computer.

26. A method in accordance with claim 16, further comprising:
receiving, by the at least one server computer, a signal to purchase selected media content other than the radio session media content; and
causing a download, from a content server to the user device of the selected media content purchased by the user.

27. A method in accordance with claim 26, wherein the at least one server computer comprises the content server.

28. A method in accordance with claim 26, wherein the at least one server computer comprises a plurality of separate server computers.

29. A method in accordance with claim 26, wherein the at least one server computer comprises a single server computer.

30. A user interface visibly displayed at a display of a user computing device, the visibly displayed user interface comprising:
- a radio control window to experience media content in a radio session occurring at the user computing device in accordance with a determined sequence;
- a radio session sequence window displaying a content list comprising entries corresponding to currently-playing and previously-played media content of the radio session at the user computing device, each entry is selectable via a corresponding purchase control button displayed in the radio session sequence window to purchase the radio session media content corresponding to the entry, the user interface further comprising a search portion to receive user input indicative of a request to search for media content independent of the radio session and to display search results on the display that include at least one indicia selectable to purchase media content other than the radio session media content, and at least one portion to receive user input indicative of a request to experience media content other than the radio session media content.

31. The user interface of claim 30, further comprising an artist window displaying artist information corresponding to media content made available via the user interface.

32. The user interface of claim 30, further comprising a folder window displaying a plurality of folders to indicate a particular folder to which purchased radio session media content is to be stored.

* * * * *